(12) United States Patent
Williams

(10) Patent No.: US 11,162,781 B2
(45) Date of Patent: Nov. 2, 2021

(54) INTERFEROMETRY SYSTEMS AND METHODS

(71) Applicant: University of Utah Research Foundation, Salt Lake City, UT (US)

(72) Inventor: Clayton C. Williams, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 0 days.

(21) Appl. No.: 16/691,932

(22) Filed: Nov. 22, 2019

(65) Prior Publication Data
US 2020/0096320 A1 Mar. 26, 2020

Related U.S. Application Data

(63) Continuation-in-part of application No. 16/313,431, filed as application No. PCT/US2017/039151 on Jun. 23, 2017, now Pat. No. 10,514,250.
(Continued)

(51) Int. Cl.
*G01B 9/02* (2006.01)
*G01B 11/14* (2006.01)

(52) U.S. Cl.
CPC .......... *G01B 11/14* (2013.01); *G01B 9/02019* (2013.01); *G01B 9/02027* (2013.01); *G01B 2290/70* (2013.01)

(58) Field of Classification Search
CPC .......... G01B 11/14; G01B 9/02027; G01B 9/02019; G01B 2290/70; G01B 9/02007;
(Continued)

(56) References Cited

U.S. PATENT DOCUMENTS 3,643,101 A 2/1972 Shipp et al.
4,600,299 A 7/1986 Abshire
(Continued)

FOREIGN PATENT DOCUMENTS

GB 2028497 3/1980
WO 2008142389 11/2008
(Continued)

OTHER PUBLICATIONS

Ermak G P et al: "two-wavelength millimeter wave "unambiguous" heterogene interf", 2013 International Khakov Symposium on Physics and Engineering of Microwaves, Millimiter and Submillimiter Waves, IEEE, Jun. 23, 2013 (Jun. 23, 2013), pp. 529-531, XP032495506.
(Continued)

*Primary Examiner* — Jonathan M Hansen
(74) *Attorney, Agent, or Firm* — Workman Nydegger

(57) ABSTRACT

An interferometry system includes a plurality of coherent light sources that each generate a beam of coherent light. Separate waveguide pathways are optically associated with each coherent light source. Each separate waveguide pathway has an endpoint configured to emit at least a portion of the beam of coherent light from the associated light source. A plurality of photodetectors is optically associated with waveguide pathways. In some cases, a retroreflector receives the light emitted from the endpoints, modulates the received light, and directs the modulated light back to the endpoints. The modulated light and a portion of the coherent light reflected from the endpoint of the waveguide pathway receiving the modulated light is directed a photodetector.

5 Claims, 13 Drawing Sheets

Related U.S. Application Data

(60) Provisional application No. 62/354,080, filed on Jun. 23, 2016.

(58) Field of Classification Search
CPC .......... G01B 9/02002; G01B 9/02003; G01B 9/02015; G01B 9/02028; G01B 9/02041
See application file for complete search history.

(56) References Cited

U.S. PATENT DOCUMENTS

| | | | |
|---|---|---|---|
| 4,675,522 A | 6/1987 | Arunkumar | |
| 4,941,744 A * | 7/1990 | Yokokura | G01B 9/02028 356/482 |
| 5,153,667 A | 10/1992 | Aoshima et al. | |
| 5,200,795 A | 4/1993 | Kim et al. | |
| 5,218,419 A | 6/1993 | Lipson et al. | |
| 5,311,592 A | 5/1994 | Udd | |
| 5,369,489 A | 11/1994 | Somekh | |
| 5,392,117 A | 2/1995 | Belleville et al. | |
| 5,541,730 A | 7/1996 | Chaney | |
| 5,790,255 A | 8/1998 | Jackson et al. | |
| 6,233,263 B1 | 5/2001 | Chang-Hasnain et al. | |
| 6,687,008 B1 | 2/2004 | Peale et al. | |
| 6,825,935 B2 | 11/2004 | Nakamura et al. | |
| 7,009,710 B2 | 3/2006 | Sullivan et al. | |
| 7,508,523 B2 | 3/2009 | Chang et al. | |
| 7,619,719 B2 | 11/2009 | Rohner et al. | |
| 8,094,292 B2 | 1/2012 | Park et al. | |
| 8,334,982 B2 | 12/2012 | Fang-Yen et al. | |
| 8,379,295 B2 | 2/2013 | Zheng et al. | |
| 8,514,404 B2 | 8/2013 | Podoleanu | |
| 2002/0093648 A1 | 7/2002 | Nikoonahad | |
| 2002/0122186 A1 | 9/2002 | Igaki et al. | |
| 2003/0223672 A1 | 12/2003 | Joyner et al. | |
| 2005/0018202 A1 | 1/2005 | Wang | |
| 2006/0088076 A1 | 4/2006 | Lubianiker et al. | |
| 2006/0109479 A1 * | 5/2006 | Tai | G01B 9/02019 356/482 |
| 2007/0171425 A1 * | 7/2007 | De Groot | G01B 9/02027 356/478 |
| 2010/0092176 A1 | 4/2010 | Hartog et al. | |
| 2010/0157310 A1 | 6/2010 | Bennett et al. | |
| 2011/0096335 A1 | 4/2011 | Levin et al. | |
| 2012/0105861 A1 | 5/2012 | Weitzel | |
| 2013/0155386 A1 | 6/2013 | Bridges | |
| 2013/0229649 A1 | 9/2013 | Li et al. | |
| 2014/0034833 A1 | 2/2014 | Parks, II et al. | |
| 2015/0085297 A1 | 3/2015 | Hughes et al. | |
| 2015/0131081 A1 | 5/2015 | Soreide et al. | |
| 2016/0305761 A1 | 10/2016 | Shaked et al. | |
| 2018/0051980 A1 | 2/2018 | Williams | |
| 2018/0364431 A1 | 12/2018 | Zhao | |
| 2019/0302263 A1 | 10/2019 | Wang et al. | |
| 2019/0353474 A1 | 11/2019 | Williams | |

FOREIGN PATENT DOCUMENTS

| | | |
|---|---|---|
| WO | 2011109895 | 9/2011 |
| WO | 2016/100986 | 6/2016 |
| WO | 2016100986 | 6/2016 |

OTHER PUBLICATIONS

U.S. Appl. No. 16/313,431, filed Dec. 26, 2018, Williams.
Bahrampour et al., "Optical Fiber Interferometers and Their Applications", Interferometry—Research and Applications in Science and Technology, Intech, Mar. 21, 2012, pp. 3-30.
International Search Report and Written Opinion of PCT/US2015/067226 dated May 12, 2016.
International Search Report and Written Opinion of PCT/US2017/039151 dated Oct. 2, 2017.
Miller, "Reconfigurable Add-Drop Multiplexer for Spatial Modes", Optics Express, Optical Society of America, Aug. 21, 2013, vol. 21, Issue 17, 10 Pages.
Miller, "Self-Configuring Universal Linear Optical Component", Photonics Research, Optical Society of America, 2013, vol. 1, Issue 1, pp. 1-15.
U.S. Appl. No. 15/537,297, Oct. 9, 2018, Office Action.
U.S. Appl. No. 15/537,297, May 14, 2019, Notice of Allowance.
U.S. Appl. No. 16/313,431, Sep. 5, 2019, Notice of Allowance.
International Search Report and Written Opinion received for PCT Patent Application No. PCT/US2020/059657, dated Feb. 5, 2021, 9 pages.
Examiner initiated interview summary received for U.S. Appl. No. 16/526,851, dated Oct. 22, 2020, 1 page.

* cited by examiner

INTERFEROMETRY SYSTEMS AND METHODS

CROSS-REFERENCE TO RELATED APPLICATIONS

This application is a continuation-in-part of U.S. patent application Ser. No. 16/313,431, filed Dec. 26, 2018, and entitled Interferometry System and Associated Methods, which is a 371 National Stage Entry of International Application No. PCT/US2017/039151, filed on Jun. 23, 2017, and entitled Interferometry System and Associated Methods, which claims the benefit of and priority to U.S. Provisional Application No. 62/354,080, filed on Jun. 23, 2016, each of which is incorporated herein by reference in its entirety.

BACKGROUND

Interferometry is a measurement technique that involves the superimposition of electromagnetic waves. One of the many advantages of interferometry includes the ability to achieve measurements with nanometer scale accuracy. Hence, it has been used extensively in metrology, microfabrication, quantum mechanics, and numerous other fields. Interferometry can also be useful for measuring displacement, rotation, refractive index changes, and numerous other variables.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 5B is a schematic diagram of a system for measuring distance in accordance with an embodiment of the present disclosure.

DETAILED DESCRIPTION

Figure 1:
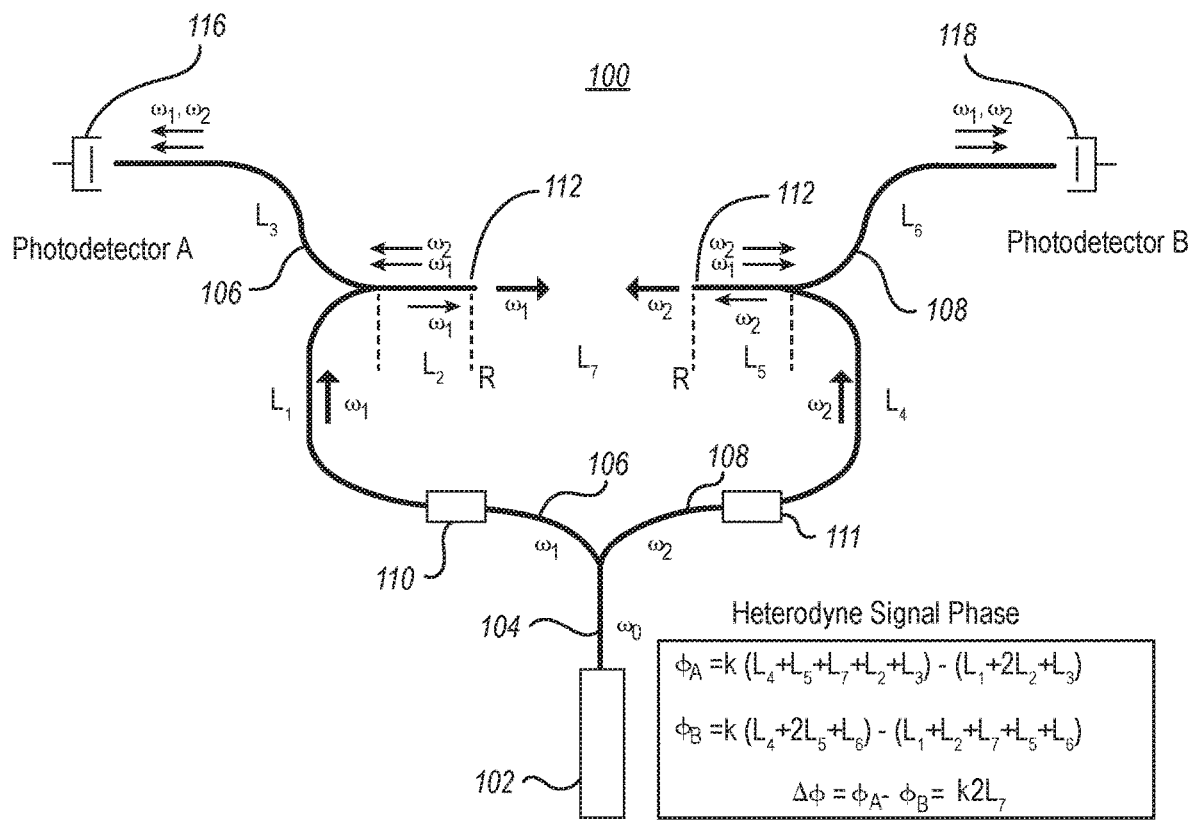
FIG. 1 is a schematic diagram of a system for measuring distance in accordance with an embodiment of the present disclosure.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of connection or attachment between one item and another item, and includes relationships of either direct or indirect connection or attachment. Any number of items can be coupled, such as materials, components, structures, layers, devices, objects, etc.

As used herein, "directly coupled" refers to a relationship of physical connection or attachment between one item and another item where the items have at least one point of direct physical contact or otherwise touch one another. For example, when one layer of material is deposited on or against another layer of material, the layers can be said to be directly coupled.

As used herein, "associated with" refers to a relationship between one item, property, or event and another item, property, or event. For example, such a relationship can be a relationship of communication. Additionally, such a relationship can be a relationship of coupling, including direct, indirect, electrical, optical, or physical coupling. Furthermore, such a relationship can be a relationship of timing.

Objects or structures described herein as being "adjacent" to each other may be in physical contact with each other, in close proximity to each other, or in the same general region or area as each other, as appropriate for the context in which the phrase is used.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term, like "comprising" or "including," it is understood that direct support should be afforded also to "consisting essentially of" language as well as "consisting of" language as if stated explicitly, and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Further, a listing of components, species, or the like in a group is done for the sake of convenience and that such groups should be interpreted not only in their entirety, but also as though each individual member of the group has been articulated separately and individually without the other members of the group unless the context dictates otherwise. This is true of groups contained both in the specification and claims of this application. Additionally, no individual member of a group should be construed as a de facto equivalent of any other member of the same group solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

The present disclosure relates to novel interferometry devices, systems, and methods for physical measurements in an environment. In one embodiment, for example, the present technology can be utilized to detect distances between two or more points, in one dimension, two dimensions, and/or three dimensions, depending on the specific design and use of a given device, system, or method. Furthermore, such distance measurements can be absolute distance measurements, relative distance measurements, or any other measurement between two or more points, including fixed points and moving points. Moving points would thus include situations where one point is moving relative to another fixed point or to multiple fixed points, as well as situations where two or more points are moving relative to one another. Thus, the present technology can be utilized to measure location, distance, and changes in location and/or distance, to track moving objects, measure velocity, acceleration, deceleration, and the like. Expansion or contraction of an object that causes variation in the distance between measurement points can also be tracked or monitored. Additionally, if the 2D or 3D position of multiple points on a rigid object are known, then the pitch, yaw, and roll of the object can be determined in addition to its 2D or 3D location.

In general, two impinging beams of electromagnetic radiation, that are sufficiently close in frequency, can interfere with one another to generate heterodyne signals in a detector. Heterodyne signals are signals resulting from the interference of two or more electromagnetic signals in a non-linear process, like photo detection, for example. The presently disclosed technology can accurately determine distance between two or more points from one or more heterodyne signals generated by electromagnetic waves transmitted through a waveguide or waveguides. In one embodiment, for example, distance is determined between two (or more) points by splitting a beam of coherent light into separate component beams, and directing each component beam along a separate waveguide pathway before recombining them. The coherent light in at least one of the waveguide pathways is frequency shifted or otherwise modulated to create heterodyne signals at a photodetector at the difference frequency (or 2f). When the light from one waveguide enters a second waveguide that has a light wave of a different frequency propagating in the same direction, the two frequency components will co-propagate. When they reach the detector, the two beams will produce a heterodyne (beat) signal at the difference frequency in the photodetector. Such heterodyne signals can be used to measure distance.

In some examples, separate beams of coherent light can be generated from a plurality of coherent light sources, and each separate beam can be propagated down a separate waveguide pathway. It is additionally contemplated that, in some examples using such separate light sources, one or more of the separate beams of coherent light can be split into separate component beams.

Thus, in some examples, the present interferometry system can include a coherent light source operable to generate a beam of coherent light. The system can further include separate waveguide pathways optically associated with the coherent light source to direct coherent light toward a photodetector optically coupled with each waveguide pathway. A transceiving segment or point can be optically associated with each waveguide pathway at a location between the coherent light source and the photodetector. Each transceiving segment can be configured to emit an emitted beam of coherent light and can be positioned to receive a portion of an emitted beam of coherent light emitted from a transceiving segment of a different waveguide pathway. The portion of the emitted beam received from the different waveguide pathway can form part of an optical interference signal generated from the superposition of beams of coherent light. Specifically, the received portion of the emitted beam from the different waveguide pathway can be superposed with a portion of coherent light from the receiving waveguide pathway, such as a reflected portion or a portion of the component beam that was not emitted, to form the optical interference signal. Thus, each waveguide pathway can be configured to direct a separate optical interference signal toward a respective photodetector.

In one specific example, an interferometry system can include a coherent light source, a first photodetector, and a second photodetector. Additionally, a first waveguide pathway can be optically associated with the coherent light source and operable to emit a first optical beam from a first endpoint (i.e. a first transceiving segment or point). A second waveguide pathway can also be optically associated with the coherent light source and operable to emit a second optical beam from a second endpoint (i.e. a second transceiving segment or point). Further, a third waveguide pathway can be configured to receive an interfering portion of the second optical beam and a reflected portion of the first optical beam such that the reflected portion of the first optical beam and the interfering portion of the second optical beam form a first optical interference signal. The third waveguide pathway can be further configured to guide the first optical interference signal to the first photodetector. Similarly, a fourth waveguide pathway can be configured to receive an interfering portion of the first optical beam and a reflected portion of the second optical beam such that the reflected portion of the second optical beam and the interfering portion of the first optical beam form a second optical interference signal. The fourth waveguide pathway can be further configured to guide the second optical interference signal to the second photodetector.

In this example, the first waveguide pathway and the third waveguide pathway can be combined to define a single waveguide pathway from the coherent light source to the first photodetector. Similarly, the second waveguide pathway and the fourth waveguide pathway can be combined to define a single waveguide pathway from the coherent light source to the second photodetector. The first endpoint and the second endpoint along each respective pathway can also be defined as first and second transceiving points, respectively, positioned along each separate pathway at a position between the coherent light source and the respective photodetector. Any suitable number of such pathways can be employed in the present system, as will be apparent from the descriptions of the system provided herein. It is also noted that the terms endpoint and transceiving segment or transceiving point are used interchangeably throughout this disclosure. Thus, reference to a transceiving segment or transceiving point can also refer to an endpoint, or vice versa.

It will also be apparent from the present disclosure that the interferometry systems described herein can be used in a variety of methods. For example, a method of determining a distance between a plurality of points can include directing a beam of coherent light along separate waveguide pathways toward a photodetector that is optically associated with each separate waveguide pathway. Each waveguide pathway can further include a transceiving segment optically associated therewith. A beam of coherent light can be emitted from the transceiving segment in each of the separate waveguide pathways to form an emitted beam of coherent light. A portion of the emitted beam of coherent light can be received at a transceiving segment optically associated with a different waveguide pathway from which the emitted beam was emitted. The received portion of the emitted beam of coherent light can form part of an optical interference signal generated from the superposition of beams of coherent light. As described above, the received portion of the emitted beam from the different waveguide pathway can be superposed with a portion, such as a reflected portion, of coherent light from the receiving waveguide pathway to form the optical interference signal. Separate optical interference signals can be delivered to respective photodetectors to generate a local interference photocurrent at each respective photodetector. A difference between the local interference photocurrents at each photodetector can be related to a distance between the transceiving segments of the separate waveguide pathways.

In one specific example, a method of determining a distance between a plurality of points can include emitting a first optical beam from a first waveguide pathway at a first endpoint or transceiving point and emitting a second optical beam from a second waveguide pathway at a second endpoint or transceiving point. An interfering portion of the second optical beam and a reflected portion of the first optical beam can be received, combined, or superposed at the first endpoint or transceiving point. The reflected portion of the first optical beam and the interfering portion of the second optical beam can form a first optical interference signal. Similarly, an interfering portion of the first optical beam and a reflected portion of the second optical beam can be received, combined, or superposed at the second endpoint or transceiving point. The reflected portion of the second optical beam and the interfering portion of the first optical beam can form a second optical interference signal. The first optical interference signal can be guided from the first endpoint along the third waveguide to a first photodetector to generate a first interference photocurrent. Likewise, the second optical interference signal can be guided from the second endpoint along the fourth waveguide to a second photodetector to generate a second interference photocurrent. A difference between the first and second interference photocurrents can be related to a distance between the plurality of points.

In this particular example, the first waveguide pathway and the third waveguide pathway can be combined to define a single waveguide pathway directing light to the first photodetector. Similarly, the second waveguide pathway and the fourth waveguide pathway can be combined to define a single waveguide pathway directing light to the second photodetector. The first endpoint and the second endpoint along each respective pathway can also be defined as first and second transceiving points, respectively, that are positioned along each separate pathway and configured to emit a beam of coherent light and positioned to receive an emitted beam of coherent light from a separate waveguide pathway. Any suitable number of such pathways can be employed in the present method, as will be apparent from the descriptions provided herein.

In one specific embodiment shown in FIG. 1, an interferometry device 100 can include a coherent light source 102 that generates coherent electromagnetic radiation at frequency ($\omega_0$) along an initial waveguide pathway 104. The coherent electromagnetic radiation, or coherent light, is split into two waveguide pathways, a first pathway 106 and a second pathway 108. However, it is noted that the light need not be split in all examples. In some cases, multiple coherent light sources can be employed to direct coherent light along separate pathways. In specific examples where the coherent light is split, any suitable splitting configuration can be used, such as a beam splitter, pigtailed waveguides, spliced waveguides, the like, or combinations thereof. As such, in some examples, the interferometer system can include a beam splitter, a waveguide splicer, or the like, to split coherent light into separate component beams. It is further noted that the L1-L7 labels in FIG. 1 represent portions of the first and second pathways. The coherent light in the first pathway has a frequency ($\omega_1$), and the coherent light in the second pathway 108 has a frequency ($\omega_2$), which is frequency shifted or otherwise modulated with respect to the other pathway in terms of any property of coherent light that can be shifted or modulated to facilitate distance measurements. Non-limiting examples can include modulating phase, frequency, amplitude, or any combination thereof. Such techniques of modulation are well known in the art, and any such device is contemplated. The coherent light in one or more pathways can be shifted or modulated, while in other examples the coherent light in one or more pathways is not shifted or modulated. As an example, FIG. 1 shows elements 110 and 111 located along each of the waveguide pathways, which can include shifters or modulators of light. These elements can include any device that is capable of shifting or modulating light in a manner that allows distance measurement according to the present technology, such as frequency shifters, phase modulators, amplitude modulators, and the like, including combinations thereof. Furthermore, the shifter or modulator element in each pathway can be the same or different as in other pathways. In some examples, one pathway may include an element, while another pathway may not.

The first pathway light at frequency $\omega_1$ and the second pathway light at frequency $\omega_2$ continue along their respective pathways 106, 108 to waveguide endpoints 112, where light at frequency $\omega_1$ and light at frequency $\omega_2$ exit their respective pathways. Light at $\omega_1$ enters endpoint 112 of the second pathway 108 and light $\omega_2$ enters endpoint 112 of the first pathway 106. Additionally, a portion of the light in each pathway is not emitted at endpoint 112, but is reflected back from endpoint 112 to continue along its initial pathway. In some cases, such non-emitted light can also be transmitted from L1 to L3 (or from L4 to L6) prior to reaching endpoint 112. As will be recognized by one skilled in the art, the index of refraction of the waveguide can be different from the index of refraction of the air outside the waveguide. As such, when the coherent light traveling along pathways 106, 108 reach their respective endpoints 112, the difference in refractive index between the waveguide and the external air will cause a portion of the light in each pathway to be emitted from endpoints 112, and a portion to be reflected back in the original pathway. Thus, the combination of the non-emitted coherent light with the coherent light received from the other pathway can produce a superposition of two frequency components at $\omega_1$ and $\omega_2$ in each of the pathways propagating toward the corresponding photodetector 116, 118. Part of this light propagates toward the photodetectors through pathways (106, 108). The superposition of the two waves produce heterodyne (beat) signals at each photodetector at the difference frequency ($\omega_1$-$\omega_2$), thus generating respective photocurrents. The photocurrents can then be detected and used to calculate the heterodyne signal phase at each photodetector 116, 118, which are in turn used to determine the distance between the endpoints 112 of the two pathways, as is exemplified below.

The coherent light source can include any light generation device or system capable of introducing coherent light into a waveguide, such as, for example, an optical fiber. Non-limiting examples can include fiber lasers, solid state lasers, gas lasers, semiconductor lasers such as laser diodes, photonic crystal lasers, and the like, including appropriate combinations thereof. In one specific aspect, the light source can be a pigtailed laser diode.

Any output power can be employed that is suitable for use with the other components of the system, such as the photodetectors. Depending upon the application, output powers can range from 1 microwatt to more than 1 watt. In many applications, however, a 1-100 milliwatt power can be used. The output power can be chosen based upon a variety of criteria, such as the desired signal to noise ratio, detection bandwidth, saturation of the linear response of the photodetectors, and any light power safety issues related to the use of the interferometer in a particular environment. In some examples, it can be desirable to maximize the output power of the coherent light source without compromising the photodetector or photocurrent generated at the photodetector so as to maximize both the lateral and longitudinal measurement ranges of the divergent beam emitted from the optical fiber.

Further, any suitable wavelength of coherent light can be used in the current system and methods. However, as will be apparent to one skilled in the art, coherent light in the infrared and visible ranges can have a number of practical advantages. Thus, in one aspect, the light source of the current system can emit coherent light having a wavelength of from 400 nm to 1000 nm and higher. In some aspects, the light source can emit coherent light in the infrared range (i.e. having a wavelength from 750 nm to 1000 nm or higher, including both IR and near IR ranges). In some aspects, the light source can emit coherent light in the visible range (i.e. having a wavelength from 400 nm to 750 nm). However, different light sources can have different limitations with respect to the coherency of the light they emit (i.e. over longer distances the ability to interfere can diminish). Thus, some light sources may not be suitable for all applications of the current systems and methods (i.e. measurements over longer distances) if the frequency range for the light source is not sufficiently narrow to generate an adequately coherent beam to produce an interference signal over the required distances. As such, frequency, power, source, and other considerations can be varied to account for the system design and the intended use. The principles described here may also be applied to electromagnetic waves of other frequencies and wavelengths, including microwaves, UV light, and radio waves.

It is noted that coherent light is delivered through the optical fiber; however, a light signal that is emitted from a waveguide endpoint, superposed or added to a second light signal reflected or reintroduced back into a waveguide may not coherently interfere, depending on the size of the waveguide, the size of the waveguide outlet, the distance between the waveguide endpoints, and the like. While there needs to be sufficient coherence in the light to generate interference, the term "coherent" can include both spatial and temporal components. Both of these components are generally needed to generate the interference effects described. Both waveguide endpoints that receive transmitted light from the opposite fiber channel or pathway should also utilize light that is not orthogonally polarized relative to the opposite fiber channel or pathway in order for the interference to occur. In this regard, polarization preserving waveguides or polarizing elements can be useful.

The waveguide can be any material capable of containing and transmitting coherent electromagnetic radiation along its length. Optical fibers, for example, can be generally flexible, and can have minimal mass. A variety of materials can be utilized as optical fiber materials including, without limitation, silica, transparent polymers, and the like, including appropriate combinations thereof. In one embodiment, a polarization preserving fiber can be used to preserve the polarization of a signal within the fiber. Furthermore, in some aspects optical fibers can include single mode fibers. In other aspects, light can be delivered without using optical fibers, and as such, any mechanism for delivering light that allows for interference to occur in the photodetectors is considered to be within the present scope. As one example, in some aspects bulk optical devices can be used to deliver light. However, due to the many practical advantages of single-mode optical fibers, specific reference will be made to this type of waveguide.

A variety of single-mode fibers can be used in the current systems and methods. In some aspects, single-mode fibers can be selected based on their numerical aperture. The numerical aperture of the single-mode optical fiber can control the angle at which the coherent beam of light will emerge from the fiber, thus controlling the lateral and longitudinal ranges of the light emitted from endpoints of an optical fiber. For example, where it is desirable to emit the beam from the fiber end at a large angle (i.e. large lateral range), a fiber with a large numerical aperture can be selected. Conversely, where it is desirable to emit the beam from the fiber end at a narrow angle (i.e. large longitudinal range), a fiber with a small numerical aperture can be selected. Accordingly, the numerical aperture of the single-mode optical fiber can be selected based on a desire for greater lateral or longitudinal coverage of the coherent optical beam. Generally, increasing lateral coverage (i.e. the beam divergence), can compromise the longitudinal range of a detectable signal. Conversely, increasing the longitudinal range (i.e., the distance over which an optical signal can be detected) can generally compromise the lateral coverage or breadth over which the optical signal will be detectable. Note that optical elements can be positioned near the waveguide ends which can increase or decrease the effective divergence/acceptance angle of the fiber.

Accordingly, the current system can be used to measure a range of distances depending on the longitudinal and lateral coverage of the system. For example, for one-dimensional measurements on a single axis, the range of the current system can be large (10 meters, or even larger). In this geometry, the coherent beams emitted out of the fibers can be collimated with a lens or made nearly collimated rather than diverging, as will be discussed more fully below. However, when three-dimensional position measurements are desired, the reference and signal beams can be diverging and, therefore, at greater distances the power falling on an optical fiber endpoint of a given pathway from another fiber can become smaller. Under these conditions, the noise can determine the maximum longitudinal and lateral distance that can be measured.

As a non-limiting example for illustrative purposes only, if light of 633 nm wavelength emitted from a fiber endpoint has a Gaussian shape with a beam waist of $2 \times 10^{-6}$ meters, then the divergence half angle will be of order 0.1 radian. This angular width corresponds to an approximate effective light emission and acceptance area of the fiber of order $4 \times 10^{-12}$ meters$^2$. In this example, it is also assumed that the Gaussian beam has a power of 1 mW. The Gaussian beam will spread as it propagates toward another waveguide (with similar effective acceptance/emission area), and then some of the optical power from the Gaussian beam will enter the other waveguide and be combined with light in the other waveguide that is reflected back into the other waveguide by the fiber end (i.e. due to the difference in refractive index between the waveguide and the external environment). The two components will co-propagate down the waveguide until they reach the photodetector, at which point they will produce a heterodyne signal in the photodetector. It is noted that the Gaussian beam light intensity from the emitting waveguide will drop as it spreads out toward the other waveguide. Assuming that a 6.3 nm resolution distance measurement is desired, requiring a photodetector heterodyne signal current signal to noise ratio of 100, the power received by the receiving waveguide (with similar effective photodetector area=$4\times10^{-12}$ meter$^2$) can be $4.8\times10^{-12}$ watts (based upon calculated shot noise and a detection bandwidth of 1 kHz under conditions consistent with this example, as shown in example 1 below). The maximum area that the signal beam will have after spreading and reaching the other fiber to produce this signal to noise ratio can be approximately $8\times10^{-4}$ meters$^2$, as determined by the following relationship: Maximum signal beam area=(signal power/minimum detected power)*(photodetector area)=($1\times10^{-3}$ Watt/$4.8\times10^{-12}$ Watt)*($4\times10^{-12}$ m$^2$)=$8\times10^{-4}$ m$^2$. In this example, this maximum beam area corresponds to an approximate beam width of approximately 2.8 cm. Thus, at a divergence angle of 0.1 radian, the beam can spread to a radius of approximately 2.8 cm and still be detected with a signal to noise ratio of 100 by a detector with an effective area of $4\times10^{-12}$ meters$^2$. This means that the two fiber ends can be laterally shifted by 2.8 cm without significant reduction in distance measurement resolution (6 nm). At this divergence angle (0.1 radian), the maximum longitudinal range of the measurement is approximately 28 cm. If the power is increased, or the bandwidth decreased or the divergence angle decreased, the longitudinal range can also be increased. Where the divergence angle is 0.01 radian, corresponding to a Gaussian beam waist of approximately $2\times10^{-5}$ meters (effective detector area=$4\times10^{-10}$, then the longitudinal range will increase to approximately 28 meters (assuming a 1 mW power, signal to noise ratio of 100), with a lateral range of approximately 28 cm.

With proper optics, the divergence angle of the fibers can be made larger or smaller. This can provide a significant amount of flexibility for performing 1D, 2D, and 3D distance measurements. For 1D measurements, precise alignment of two fiber endpoints is not necessary, because measurements can be performed even if the endpoints are not laterally aligned to better than 2.8 cm (with respect to the first non-limiting example).

Continuing the non-limiting example, where several reference fiber endpoints are placed in a reference plane, which in some examples is at a fixed position, and at a separation of less than 2.8 cm between them, where each reference fiber endpoint is configured to separately measure the distance between that reference fiber endpoint and a signal fiber endpoint, then measurement of the three dimensional position of the signal fiber endpoint can be detected over a large lateral range (much larger than the individual lateral range of each endpoint pair (2.8 cm), using triangulation methods. In some further examples, a plurality of signal fiber endpoints can also be used with the plurality of reference fiber endpoints. In some examples, the number of reference fiber endpoints can exceed the number of signal fiber endpoints.

Suitable ranges can be ranges at which a fiber/photodetector (as shown in FIG. 1) can detect an interfering optical signal from an associated fiber/photodetector. As shown above, the minimum detectible power of the interfering beams can be determined by the noise which dominates in the detection process and the bandwidth of the detection system. As is shown below, a heterodyne interference signal detected by a photodetector is proportional to the square root of the product of the power of the two interfering waves. The light wave which is reflected from the endpoint of the waveguide is typically very strong compared to the beam which is transmitted from one waveguide and enters the other. Under these conditions, the heterodyne power can be much larger than the power of the transmitted wave by itself, making it possible to detect very small amounts of light transmitted between the two fibers.

As previously discussed, an optical fiber can be a single optical fiber or split into separate fiber channels, thus splitting the beam of coherent light into separate component beams and directing each component beam along a separate waveguide pathway. A single or multiple fiber channels can include a frequency shifter, phase modulator, optical modulator, or the like. Nonlimiting examples of phase modulators or optical modulators can include an acousto-optic modulator, an electro-optic modulator, a magneto-optic modulator, a mechano-optic modulator, a phase modulator, or other suitable device. In one example, a frequency shifter can be used. In another example, a phase-modulator can be used. In yet another example, an acousto-optic modulator can be used. As such, coherent light is delivered into at least two pathway channels, and is frequency shifted or modulated via frequency or phase modulation devices in at least one channel such that the light in each separate channel has a different frequency ($f_1$, $f_2$, $f_3$ . . . ). It is noted that various types of modulation can be utilized, including without limitation, frequency modulation, phase modulation, amplitude modulation, frequency shifting, phase shifting, and the like, including combinations thereof. By using a different modulating frequency in each channel, interference between any pair of channels can be independently detected by measuring the heterodyne signal at the difference frequency of the two channels.

Any type or design of photodetector can be used, such as, for example, a photodiode having a p-n junction or a p-i-n junction. As will be appreciated by one skilled in the art, many suitable variations or alternatives can be employed to select and/or prepare a suitable photodetector.

The photodetector is positioned so as to receive the two co-propagating waves in the waveguide at $\omega_1$ and $\omega_2$ (heterodyne signal) from the associated channel, which can be accomplished using a number of configurations. For example, in one embodiment the photodetector can be pigtailed directly to the waveguide channel. In another case, the light waves emitted from the waveguide channel can be focused on the photodetector using a lens or other similar optical device.

A variety of lenses can be used at any useful location along any of the waveguide channels, such as at the waveguide endpoints (FIG. 1, 112) or at the waveguide channel/photodetector interface, for example. Depending on a particular application, such a lens can function to change the angle of divergence, to collimate and/or refocus the light signal at a specific location, or the like. As non-limiting examples, graded index lenses or regular lenses can be used. Thus, similar to the numerical aperture of the optical fiber, the lens can also be used to control the beam divergence and the associated longitudinal or lateral coverage of the beam.

As previously noted, at least one waveguide channel can be directionally oriented toward another waveguide channel such that light emitted from the waveguide endpoints will impinge upon an opposite-facing waveguide channel endpoint. Heterodyne signals generated thereby are picked up by the waveguide endpoints, and therefore a given photodetector receives at least a component of light from both waveguide channels. Once at the photodetector, each heterodyne signal generates charge carriers in the associated photodetector related to the optical field variations in that signal. The electrical signal that is output from a given photodetector is an electronic representation of the heterodyne signal, which can be used to determine the distance between the waveguide endpoints (e.g. FIG. 1, 112). One parameter that can be useful is the phase of the heterodyne signal, which can be detected using a lock-in amplifier or other suitable device. It can be shown that by measuring the phase of the heterodyne signal at each photodetector, and comparing these phases (taking their difference), the optical path length (phase delay) experienced by the light while in each of the waveguide pathways can be eliminated. Simultaneously, the difference phase between the heterodyne signals from the two detectors can be directly related to the distance between the waveguide endpoints or changes in the distance between the waveguide endpoints.

Figure 2A:
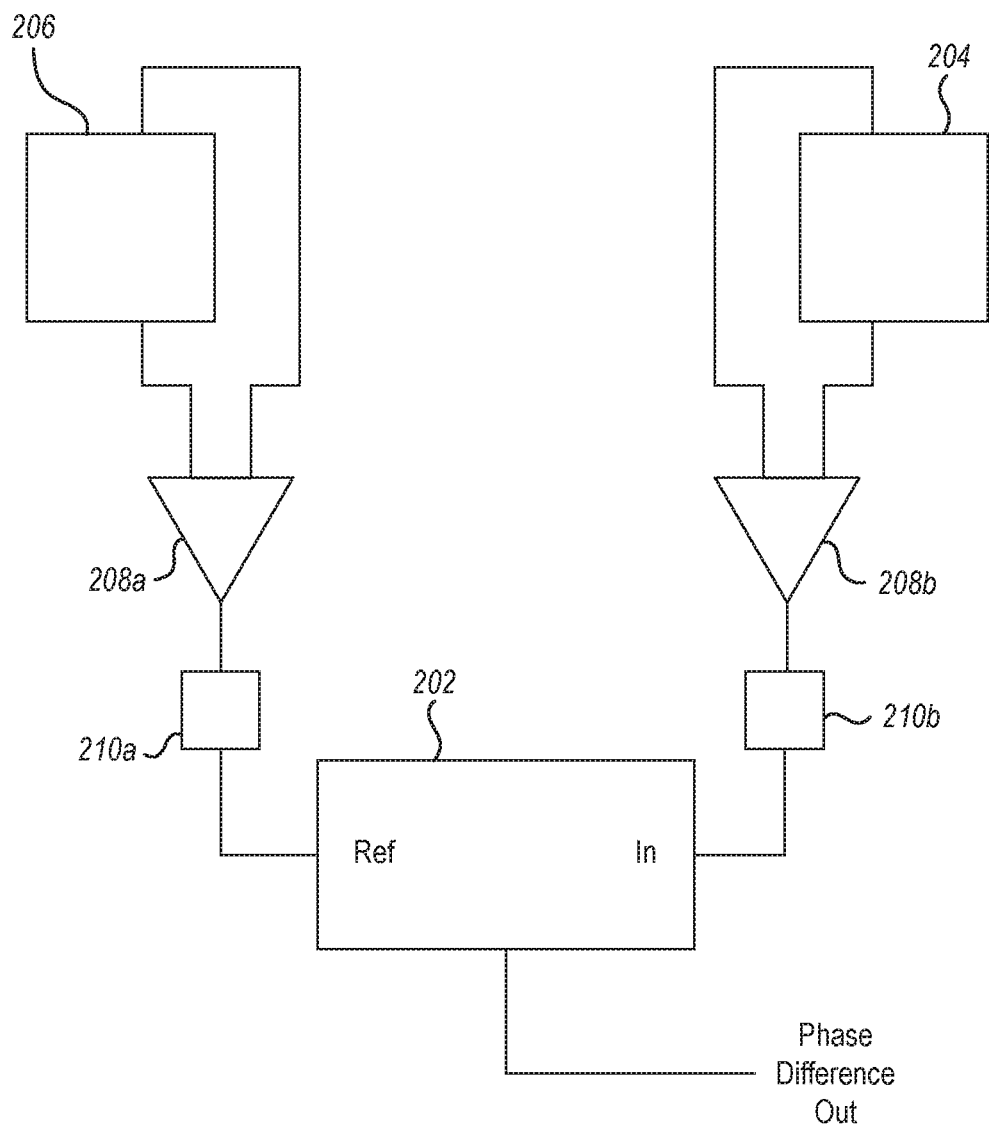
FIG. 2A is a schematic diagram of a system for measuring distance in accordance with an embodiment of the present disclosure.
Figure 2B:
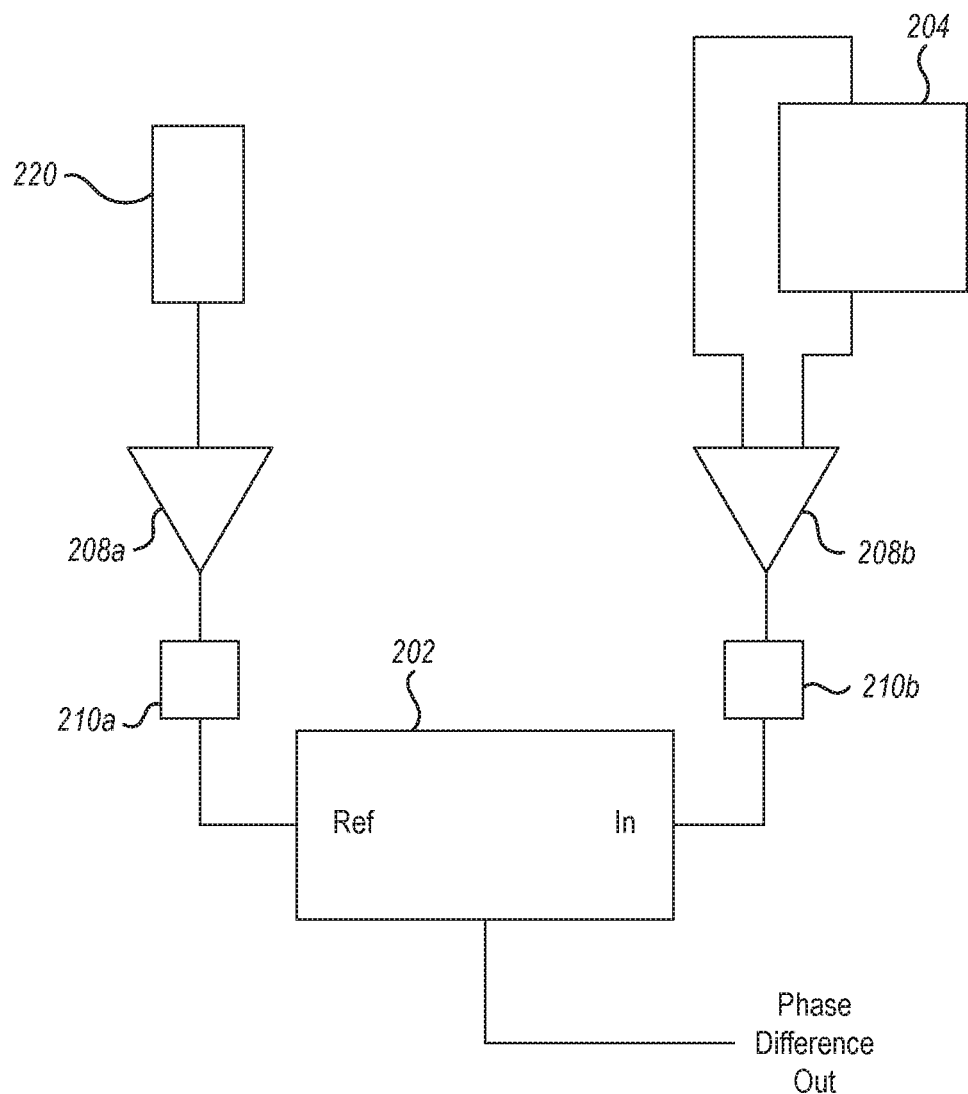
FIG. 2B is a schematic diagram of a system for measuring distance in accordance with an embodiment of the present disclosure.

Various techniques can be utilized to detect phase, and while lock-in amplifiers are specifically described, such should not be seen as limiting as the present scope includes other known phase detection techniques. As illustrated in FIG. 2A, one example of a lock-in amplifier 202 can be used to detect the photocurrents from each photodetector 204, 206. Respective photocurrents generated at photodetectors 204 and 206 can be amplified via amplifiers 208a,b. Optional filters 210a,b can be used to filter the signals before going into the lock-in amplifier 202. However, in many cases a lock-in amplifier can provide adequate signal filtering without the addition of supplemental filters. In this case, the heterodyne signal from one detector is used as the reference signal to the two channel lock-in amplifier which detects the signal from the other detector. Thus, a lock-in amplifier can be used to reliably detect and extract the phase difference between the heterodyne signal coming from each of the two photodetectors. Alternatively, as illustrated in FIG. 2B, a frequency signal from an optical modulator 220 can be sent as a reference signal to the lock-in amplifier 202, detecting the phase of the heterodyne signal from a detector with respect to the electrical signal used to produce the optical modulation in that waveguide. FIG. 2B illustrates a signal coming from a single optical modulator and waveguide.

As is described in more detail below, the interference photocurrent from each of the photodetectors can be used to determine the distance or change in distance between the waveguide endpoints. It is noteworthy that the two heterodyne signals from the two photodetectors are at the same frequency (difference between the two modulation frequencies of the two channels or fiber arms). These can be detected by a single lock-in amplifier, if one signal is input as the reference to the lock-in amplifier and the other as the signal to the lock-in amplifier. It is also possible to use two separate lock-in amplifiers, each detecting the heterodyne signal from each photodetector separately, using a lock-in amplifier reference produced directly from the modulators (electrical signal) at the difference frequency of the two modulators, and the lock-in signal coming directly from a single photodetector. In this scenario, the phase of each signal can be measured separately, and then the difference between the two signals can be determined by subtracting the two-phase signals from the two lock-in amplifiers.

Figure 3:
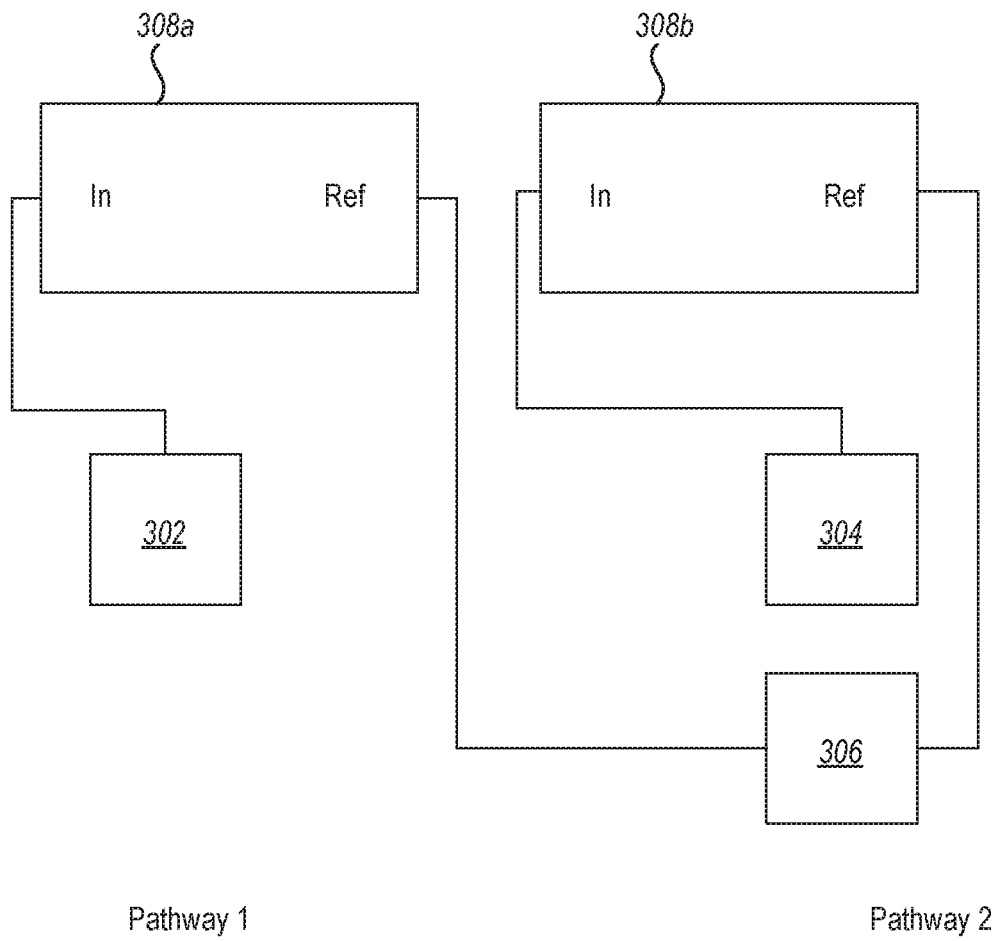
FIG. 3 is a schematic diagram of a system for measuring distance in accordance with an embodiment of the present disclosure.

For example, FIG. 3 shows one embodiment of an electronic configuration for phase detection where a modulator is used on one pathway. In this case, pathway 1 (not shown) delivers light to a first photodetector 302, and pathway 2 (not shown) delivers light to a second photodetector 304 via an optical modulator 306. As illustrated, separate lock-in amplifiers 308a,b can each detect the heterodyne signal at each photodetector 302,304 separately, using a lock-in amplifier reference produced directly from the modulator 306 (electrical signal).

Figure 4:
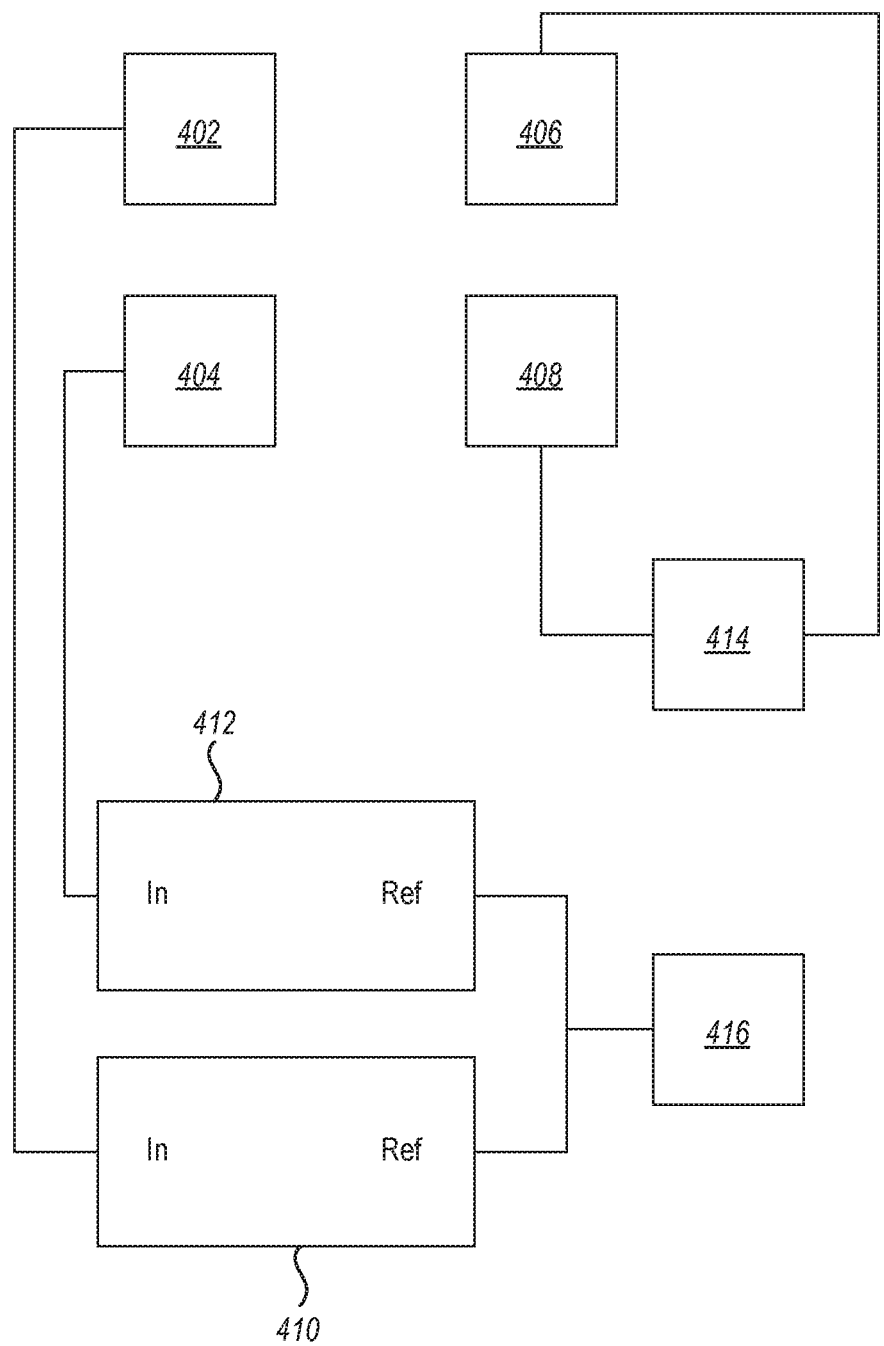
FIG. 4 is a schematic diagram of a system for measuring distance in accordance with an embodiment of the present disclosure.

FIG. 4 illustrates another electronic embodiment for phase detection, where the light pathway has been removed for clarity. Light is delivered to photodetectors 402, 404 through optical modulators 406, 408. Electronic signals generated in the photodetectors 402, 404 from the heterodyne signals is delivered to the signal inputs of lock-in amplifiers 410, 412. The electronic difference frequency of the optical modulators 406, 408 can be used as a reference signal for the lock-in amplifiers 410, 412. In one example, the optical modulator 406, 408 frequencies can be sent to a mixer 414 to obtain $f_1+f_2$ and $f_1-f_2$ reference signals. A filter 416 filters the reference signal $f_1+f_2$ and passes the $f_1-f_2$ reference signal to the reference input of the lock-in amplifiers 410, 412. In this scenario, the phase of each heterodyne signal can be measured separately, and then the difference between the two signals can be determined by subtracting the two phase signals from the two lock-in amplifiers.

In some example embodiments, waveguide endpoints can be oriented in a common direction, resulting in a novel device for measuring distances in a variety of applications. In such a geometry, coherent light emitted from a first waveguide endpoint travels to a surface, and is reflected back, either by the surface itself or a reflector on the surface (e.g. a retro-reflector element in one example). The light from the first waveguide then enters the second waveguide and produces a beat signal at the photodetector of the second waveguide. The same is true for the light emitted from the second waveguide. It travels to the surface and is reflected back from the surface or a reflector (or retro-reflector). This reflected light then travels and enters the first waveguide where it produces a beat signal detected by the photodetector of the first waveguide. Since the beat signals in both detectors are at the same frequency, a phase difference between the two beat (heterodyne) signals can be measured, in the same way as when the two fibers are pointing toward each other. This system measures the round trip distance involving a reflection from a surface between the two fibers.

Figure 5A:
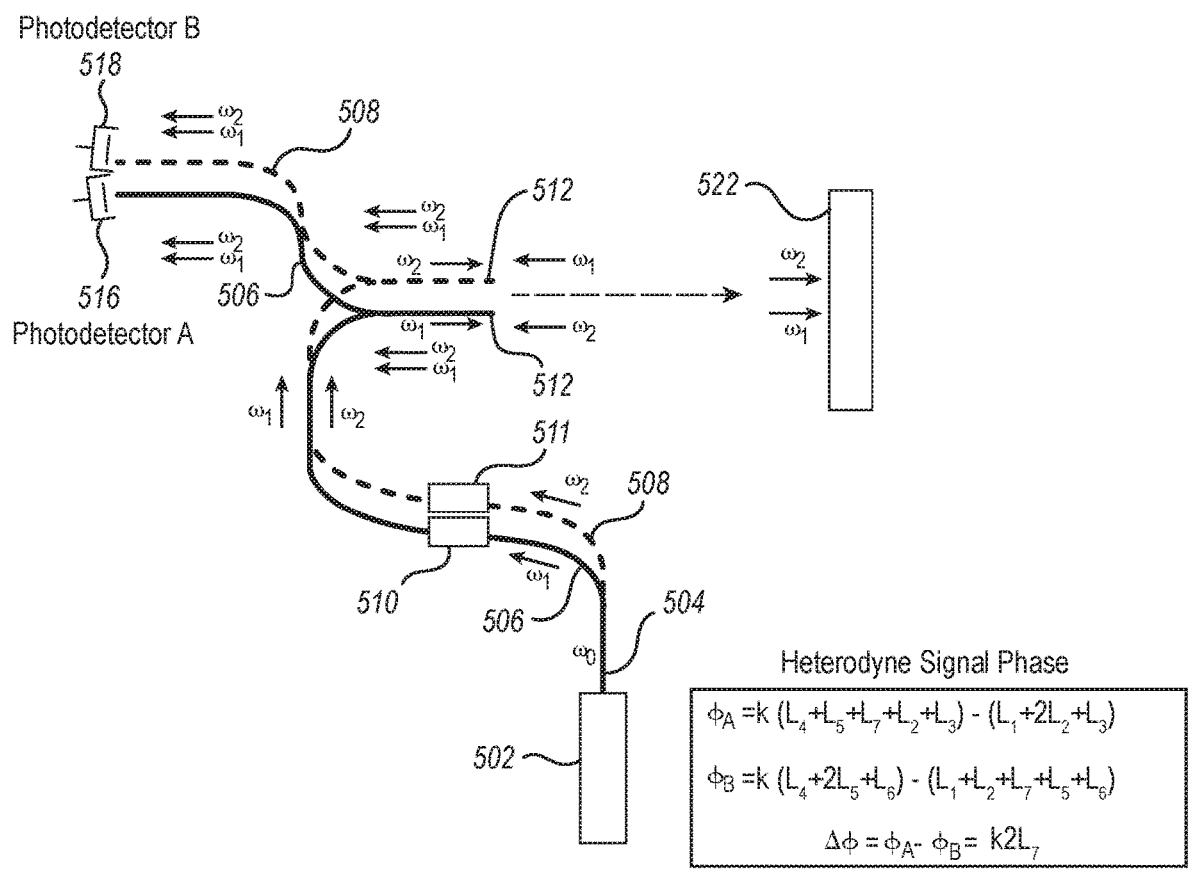
FIG. 5A is a schematic diagram of a system for measuring distance in accordance with an embodiment of the present disclosure.
Figure 5A:
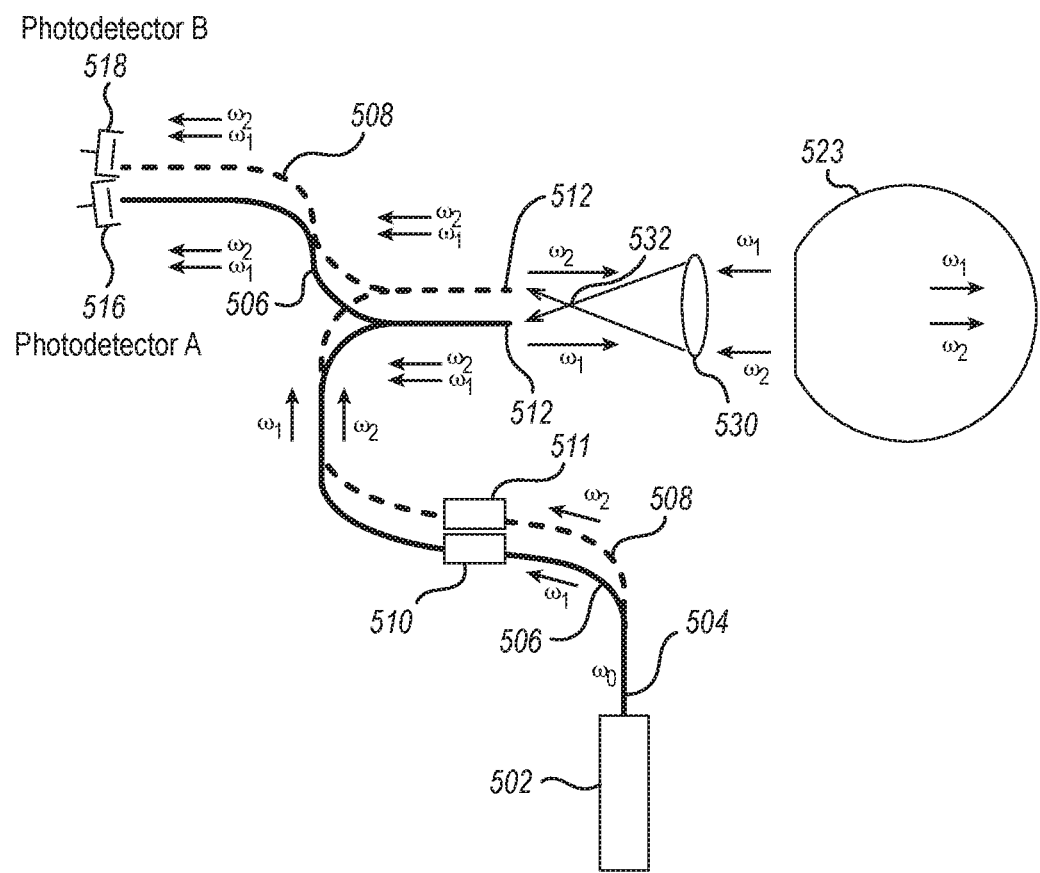

As is shown in FIG. 5A, for example, an interferometry device 500 can include a coherent light source 502 that generates coherent light along an initial waveguide pathway 504 ($\omega_0$). The coherent light is split into two waveguide pathways, a first pathway 506 ($\omega_1$) and a second pathway 508 ($\omega_2$). The coherent light in one of the pathways is shifted or otherwise modulated with respect to the other pathway in terms of any property of coherent light that can be modulated to facilitate distance measurements. Non-limiting examples can include modulating phase, frequency, amplitude, or any combination thereof. Such techniques of modulation are well known in the art, and any such device is contemplated. In some examples, the coherent light in both pathways (or in every pathway, in cases of more than two pathways) can be shifted or otherwise modulated. As an example, FIG. 5A shows a light modulator 510, 511 located along each of the waveguide pathways. The light modulators 510, 511 can be any device that is capable of modulating light in a manner that allows distance measurement according to the present technology, such as frequency shifters, phase shifters, amplitude modulators, and the like, including combinations thereof. Furthermore, the light modulator in each pathway can be the same or different from the light modulator in other pathways. In some examples, one pathway may include a light modulator, while another pathway may not.

Whether modulated or not, the first pathway light $\omega_1$ and the second pathway light $\omega_2$ continue along their respective pathways 506, 508 to waveguide endpoints 512, where light $\omega_1$ and light $\omega_2$ exit their respective pathways. It is noted that, while the first and second waveguide pathways can be the same or different lengths and can follow the same or different paths, the waveguide endpoints 512 are positioned adjacent to one another, pointing in the same direction or a direction such that the light from one fiber, after reflection can enter the other waveguide. Light $\omega_1$ and light $\omega_2$ are emitted from the waveguide endpoints 512 and reflect off of a surface 522 to be measured. A portion of reflected light $\omega_1$ enters the waveguide endpoint 512 of the second pathway 508, and forms a heterodyne signal on the detector 518 of waveguide 2. Similarly, a portion of the reflected light $\omega_2$ enters the waveguide endpoint 512 of the first pathway 506, and forms a heterodyne signal at the photodetector 516 of waveguide 1, generating the respective photocurrents. The photocurrents can then be used to calculate the heterodyne signal phase at each photodetector 516, 518, which are in turn used to determine the distance from the waveguide endpoints 512 to the surface 522.

FIG. 5B illustrates a variation of FIG. 5A. Specifically, in the example depicted in FIG. 5B, the reflective surface 522 has been replaced with a retroreflector 523 (e.g. a spherical retroreflector or "cat's eye," for example). Further, a lens 530 has been positioned proximate the endpoints 512, which are positioned close together (such as within 25 micrometers, for example). The lens 530 can be positioned such that the focal point 532 of the lens 530 can be further from or nearer to the lens 530 than the endpoints 512, which can allow light from pathway 506 to illuminate endpoint 512 of pathway 508, and vice versa. This can help maximize the amount of coherent light impinging on each of the fiber ends.

Figure 6A:
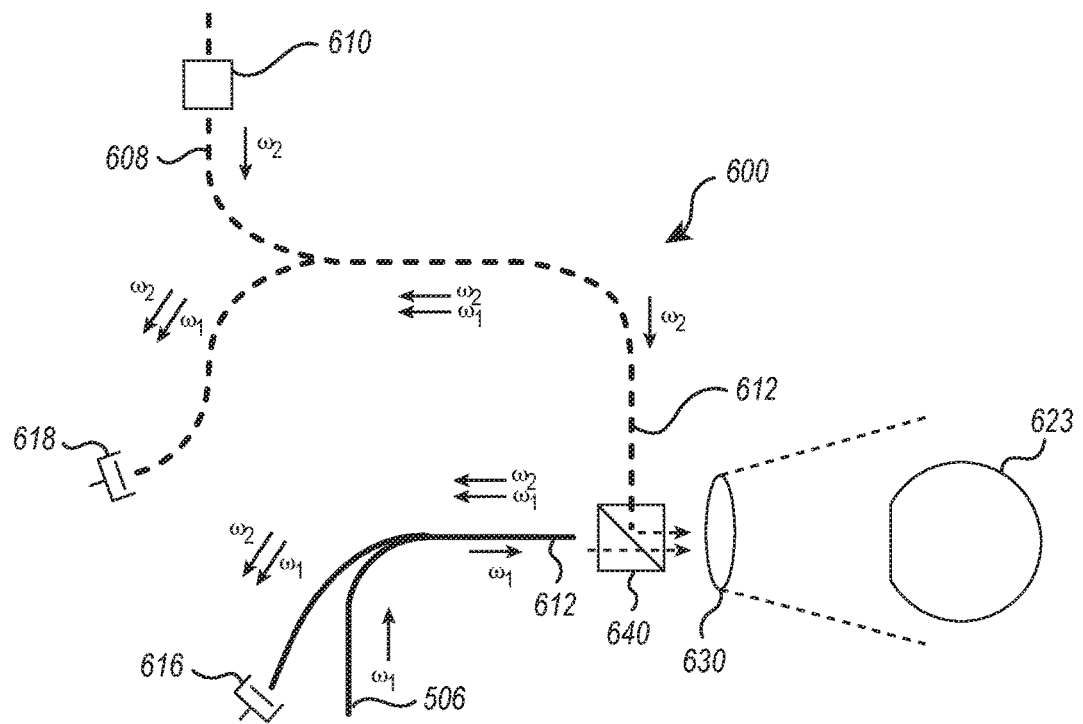
FIG. 6A is a schematic diagram of a system for measuring distance in accordance with an embodiment of the present disclosure.
Figure 6B:
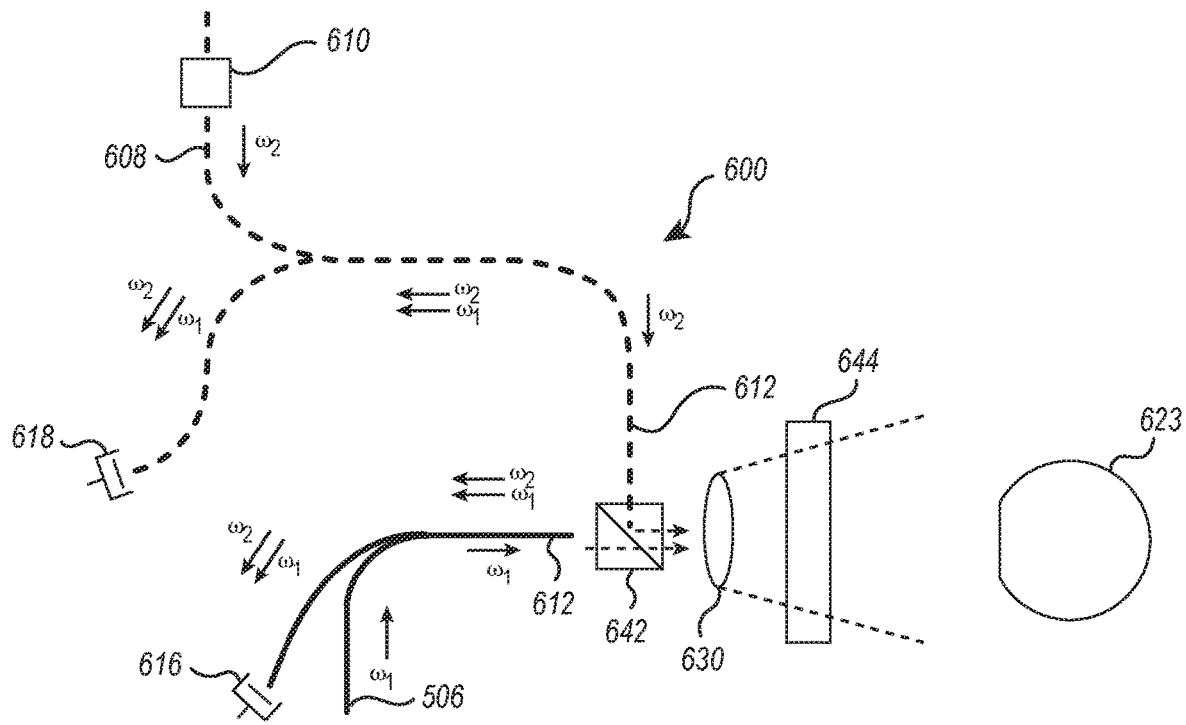
FIG. 6B is a schematic diagram of a system for measuring distance in accordance with an embodiment of the present disclosure.

FIGS. 6A and 6B illustrate some examples of the present system where the fiber ends are not facing one another or facing in a common direction. In some examples, the fiber ends can be positioned orthogonal to one another. As is shown in FIG. 6A, for example, an interferometry device 600 can direct coherent light along a first pathway 606 ($\omega_1$) toward photodetector 616 and along a second pathway 608 ($\omega_2$) toward photodetector 618. The coherent light in one of the pathways can be shifted or otherwise modulated via modulator 610. Any suitable modulator can be used, such as described above with respect to FIG. 5A. Prior to reaching photodetectors 616, 618, the first pathway light $\omega_1$ and the second pathway light $\omega_2$ continue along their respective pathways 606, 608 to waveguide endpoints 612, where light $\omega_1$ and light $\omega_2$ exit their respective pathways.

The first pathway light $\omega_1$ and the second pathway light $\omega_2$ can then be split by a beam splitter 640. In some specific examples, the first pathway 606 and the second pathway 608 can be optically associated with the beam splitter 640 at their respective endpoints 612. Whether coupled or not, split potions of the first pathway light $\omega_1$ and the second pathway light $\omega_2$ can be directed toward a reflective surface, such as retroreflector 623. Optionally, the split potions of the first pathway light $\omega_1$ and the second pathway light $\omega_2$ can be focused toward retroreflector 623 using a lens 630. In some examples, the beam splitter 640 can be configured to direct the first pathway light $\omega_1$ and the second pathway light $\omega_2$ toward the retroreflector 623 without the use of a lens 630. Light $\omega_1$ and light $\omega_2$ are reflected off of the retroreflector 623 and directed back to the beam splitter 640. In some examples, a lens 630 can be positioned to focus the reflected light $\omega_1$ and reflected light $\omega_2$ toward the beam splitter 640. A portion of the reflected light $\omega_1$ is directed by the beam splitter 640 to enter the waveguide endpoint 612 of the second pathway 608, which forms a heterodyne signal on the detector 618 of waveguide 2, generating the respective interference photocurrent. Similarly, a portion of the reflected light $\omega_2$ is directed by the beam splitter 640 to enter the waveguide endpoint 612 of the first pathway 606, which forms a heterodyne signal at the photodetector 616 of waveguide 1, generating the respective interference photocurrent. The photocurrents can then be used to calculate the heterodyne signal phase at each photodetector 616, 618, which are in turn used to determine the distance from the waveguide endpoints 612 to the retroreflector 623.

FIG. 6B illustrates a variation of the system depicted in FIG. 6A. Specifically, in the example illustrated in FIG. 6B, the beam splitter 642 can be a polarizing beam splitter. A quarter wave plate 644 can be used in connection with the polarizing beam splitter 642. In this specific example, the polarizing beam splitter 642 can be configured to direct polarized light $\omega_1$ and polarized light $\omega_2$ through the quarter wave plate 644 and onto the retroreflector 623. The polarized light $\omega_1$ can be reflected from the retroreflector 623 back through the quarter wave plate 644 and polarizing beam splitter 642 to maximize the amount of light $\omega_1$ that enters fiber endpoint 612 of the second pathway 608, which forms a heterodyne signal on the detector 618 of waveguide 2. Similarly, the polarized light $\omega_2$ can be reflected from the retroreflector 623 back through the quarter wave plate 644 and polarizing beam splitter 642 to maximize the amount of light $\omega_2$ that enters fiber endpoint 612 of the first pathway 606, which forms a heterodyne signal on the detector 616 of waveguide 1. The photocurrents can then be used to calculate the heterodyne signal phase at each photodetector 616, 618, which are in turn used to determine the distance from the waveguide endpoints 612 to the retroreflector 623.

Numerous applications for such a system of measurement are contemplated, a few non-limiting examples of which are described. The sensitivity of a well-compensated interferometer can be used to detect very small height or index of refraction changes on a surface. Such a system can scan across a surface, taking multiple distance measurements to characterize various surface features, roughness, refraction changes, and the like. Non-limiting examples can include finger print scanners, thin film detectors, defect detectors, molecular film location detection (DNA gel electrophoresis readout), and the like. Such a system can also be used to read out a topographic bar code, which would be based on surface height or phase delay of a surface structure. In another example, the system can be used as a credit card reader, in which the information is encoded by topography or optical phase. A system using reflection mode can be used for surface profiling, as in a scanning microscope, or a non-contact inspection system, even on rough surfaces. In another example, such a system can be used to detect the motion (defection) of an Atomic Force Microscope cantilever. When a known physical distance change is available, it can be used to measure the index of refraction of a medium. Waves or disturbances passing through a known separation between the fiber ends can be used to detect and determine the strength of the wave passing through. Examples would be to measure sound in air or water (hydrophone), or temperature, chemical composition, pressure of gas or liquid through which the optical beam pass. One example may include measurement of surface acoustic waves, for example, in a surface acoustic wave filter.

In another embodiment, the system can be utilized to detect only light from a dynamic spatially localized phase shifter oscillating at a fixed frequency. In this implementation, the system described above can be used to send light from one fiber (at frequency w1) into the other fiber by reflecting from a surface. Light from the other fiber (at frequency w2) is sent to the surface and enters the first fiber in a similar way. However, in this case, a reflecting element is placed on the surface, and its vertical position is modulated by an actuator (at frequency w3), such as a piezoelectric film or device. This modulation of its height will produce a phase modulation on the reflected beams. Typical phase modulation amplitudes would be 90 degrees or Pi/2. If the modulation occurs at a fixed frequency (w3), a beat signal can be obtained at frequency w1−w2+w3 or w1−w2−w3 at both detectors. The phase of these beat signals can be measured and compared to determine movement and or location of the localized reflecting phase shifter element at the surface. The advantage of this system is that only light that is phase modulated at frequency w3 is detected. Therefore, any light scattered back into the fibers by the surrounding surface will not contribute to the detector signal at frequency w1−w2+w3 (or other fixed frequencies). In another example, such measurements can be performed using light at the same frequency from each fiber (w0). In that case, the phase modulation at frequency w3 would produce a beat signal in each fiber at frequency w3 and its harmonics. This would eliminate the need for frequency shifters in the waveguide pathways.

In some example embodiments, distance can be determined using multiple waveguides, including the waveguide endpoints, one or more surfaces or layers of the photodetectors, or other photodetector structures, and the like, and as such, the locations of where distance measurements are taken from should not be seen as limiting the present scope. In one specific aspect, the distance is the distance between the cores of the fiber waveguides. In other cases, distance can be a measure of changes in distance or location, and thus a distance from a reference point to a given position can be determined without knowing the exact location of the waveguide endpoints.

Additionally, 2D or 3D measurements can be made using the principle of triangulation. For example, a 1D system can be constructed to measure changes in distance using a single pair of waveguides and detectors. In this system, the divergence of the light can make it possible to move one of the two waveguides laterally with respect to the other over a finite lateral range without losing the interference signal. The distance measured by this system will be the changes in absolute distance between the two waveguide endpoints even when the two endpoints are not aligned on a single axis. The distance measured will be the total 3 dimensional distance between the two endpoints.

From this system, a 2D or 3D system can be constructed. This can be done by having one signal or positioning waveguide endpoint whose 3D position is of interest to be known, and then a series of other reference waveguide endpoints that are fixed in a reference grid. These reference detectors can be arranged such that each acts with the signal waveguide endpoint to uniquely measure the change in absolute 3D distance between the reference waveguide endpoints and the signal waveguide endpoint at any given time. This can be achieved by causing each reference waveguide endpoint to have a unique frequency shift in that pathway that is different from all other reference endpoints, thus enabling the interference signal from each adjacent pair of reference endpoints to be independently detected. If the reference endpoints are all laterally separated in space and fixed, by measuring the changes in 3D distance between the signal waveguide endpoint and all, or a plurality, of the reference waveguide endpoints, triangulation formulas can be used to uniquely determine the 3D position of the signal waveguide relative to the known reference waveguides. Thus, to have 3D knowledge of the signal waveguide endpoint, at least three reference endpoints can be used. The light from a single laser source can be modulated (frequency shift, phase shift, amplitude) in each reference arm at a different frequency to provide a unique signal to that arm. Initial calibration procedures of the 3D position of the waveguide endpoints may be needed to establish the equations to extract the 2D or 3D position of the signal endpoint. Once calibrated, these relationships will enable the 2D or 3D position to be determined at a rapid rate.

In other example embodiments, systems can be utilized to provide 3D position measurements that can include rotation, linear (3D), pitch, yaw, rotation, and straightness, as well as coordinate measurement machine (CMM) functionality. 3D position measurements of a signal fiber end can be made over a 3D volume under various conditions using at least 3 reference fibers and at least 1 signal fiber. If the measureable volume is larger than what can be accessed by the 3 reference detectors due to their finite acceptance angle, then one can use a rotational device to reorient the reference and signal detectors so that they now fall within the divergence/acceptance angle to perform distance measurement. However, since rotation of the reference or signal fibers may change the 3D location of their end points, a method for determining the new position of the fiber ends relative to their positions before rotation is needed. By having 3 signal fibers (with frequencies w1,w2,w3) and 3 reference fibers (with frequencies w4,w5,w6), all able to exchange light between each another, the changes in position of each fiber can be determined, even during rotation. If all positions are known initially, then the changes can be constantly monitored to determine the location at any given time. If the reference fibers (rigidly affixed to a plate, with pre-calibrated 3D locations) are rotated from their initial positions, then by monitoring the distance between each fiber end and the 3 signal fiber ends (whose position is known by previous measurements), then the new 3D positions of the reference detectors can be determined, using standard triangulation methods. Once the rotation of the reference detectors has occurred and the new location of the 3 reference fiber ends is known, then the 3 signal fibers can be rotated, while monitoring the distance between all of the 3 signal fibers and the 3 reference fibers. With knowledge of the position of the signal fiber ends before rotation, and the measured displacement changes of each fiber measured during the rotation, the new 3D location of each of the signal fibers can be determined after rotation. At this point, the position of all of the 3 signal fibers relative to the 3 reference fibers is known, so additional relative movement between the signal and reference fibers can be accurately measured over the additional measurement volume provided by the rotational movements. When the position of the 3 signal fibers again starts to fall outside of the angular range of the signal fibers (and vice versa), the process can be repeated. By this method, a 3D measurement of the signal fibers can be determined over a large 3D volume, even when it is required to rotate both the signal and reference fibers to assure that they fall within the divergence/acceptance angles of the fibers.

In some geometries, it is advantageous to have a large fiber divergence angle, so that the light diverges quickly and so that light detected can arrive from large angles and still be collected by the fiber. The acceptance angle of a single mode fiber is determined by the numerical aperture of the fiber, which is set by the size of the fiber mode and index of refraction difference between the core and the cladding. By adding various types of optical elements, the numerical aperture can be increased or decreased. Such elements include an aperture, divergent or convergent lens, diffraction grating, phase grating, evanescently coupled film, diffusing film or a reflector.

Single mode fiber connectors can have a deposition of one or more thin films either to create a reflection at the interface or to avoid reflection. This principle can be used to optimize the 3D fiber interferometer. Fiber ends can be coated to increase or decrease reflection at the interface.

Triangulation methods are well known for determining 3D location. These methods will be used to determine the location of signal and reference fibers. When multiple measurements are performed, additional determination of the pitch, yaw, roll and straightness of a rigid object is possible, among other degrees of freedom.

When using a fiber interferometer system in which the light is emitted in the same direction from each fiber, it may be necessary to provide a means for the light returning from the reflective surface to enter into the other fiber from which it was not emitted. There are many methods know in the art to redirect light beams including beam splitters, diffusers, apertures, gratings, defocussed lenses, etc.

Use of polarization preserving fibers may be necessary in order to avoid inadvertent polarization rotation, which could cause the amplitude of the beat or heterodyne signal to become small or disappear.

In all measurements discussed here, with a known fixed wavelength of light, the heterodyne signal phase difference can be related to the distance (optical path length) the light has traveled between the fiber ends. To achieve simple measurements, each cycle of phase delay (called a fringe) can be counted, corresponding to an optical path length change of 1 wavelength. These fringes can be counted digitally providing a way to measure distance. If sub-fringe (sub-wavelength) position resolution is needed, then rather than counting fringes, the phase difference can be measured with sub-fringe precision, by directly measuring the absolute phase difference between the two detectors. In that case, sub-wavelength precision can be achieved in the distance measurement. Achieving distance resolution of $\frac{1}{1000}$ of a wavelength or less is possible using this method.

Multiple fibers pointing in different directions can also be used to avoid the limitation imposed by finite numerical aperture of the fibers used. These fibers could be multiplexed (sending light into them by light switches only when needed) or could have light emitted from them continuously.

Calibration of the interferometer system can be accomplished in a number of ways. In one example, a separate calibrated positioning system can be used to accurately scan the signal (e.g., movable) fiber (or fiber end) laterally and at different ranges while near reference (fixed) fibers (or fiber ends). During the scans, the distances between the signal fiber (or fiber end) and the reference fibers (or fiber ends) can be measured interferometrically using the present methodology. This distance data can then be. fitted to triangulation formulas, which can be used to uniquely determine the location of the reference (e.g., fixed) fibers (or fiber ends). With the positions of the reference fibers (or fiber ends) known, the reference fibers (or fiber ends) can then be used to locate the 3D position of other fibers (or fiber ends) relative to the reference locations. Once calibrated, the location of the other fibers (or fiber ends) can be determined without the calibrated positioning system.

As has been described, the difference in phase between heterodyne signals is used to detect the distance or change in distance between the waveguide endpoints and to eliminate dependence on the optical path differences in the two fiber arm paths. More specifically, the optical interference of the two waves in the photodetectors produce charge carriers in each, and the resulting photocurrents contain heterodyne signals that can be compared to detect the change in distance between the waveguide endpoints. Without intending to be bound by any scientific theory, the photocurrents produced in each detector include a static (dc) and a time varying photocurrent. The photocurrent in each detector can be sinusoidal or sinusoidal-like, having a frequency of about the frequency difference Δf between the optical beams in the two arms of the interferometer.

The following describes the optical phase difference Δφ between the two paths (the optical wave number $k_0 = 2\pi/\lambda_0$). The description uses the terms from FIG. 1. At photodetector A, there will be a sinusoidal photo-current (heterodyne signal) at the difference frequency (Δf) with a phase as shown by Equation I:

$$\phi_A = k[(L_4+L_5+L_7+L_2+L_3)-(L_1+2L_2+L_3)] \quad \text{I}$$

At photodetector B, there will be a sinusoidal photo-current (heterodyne signal) at the difference frequency (Δf) with a phase as shown by Equation II:

$$\phi_B = k[(L_4+2L_5+L_6)-(L_1+L_2+L_7+L_5+L_6)] \quad \text{II}$$

If the phase at each photodetector is measured by, for example, a lock-in amplifier, and the difference Δφ between the phases is measured, the result is as shown in Equation III:

$$\Delta\phi = \phi_A - \phi_B = k2L_7 \quad \text{III}$$

As can be seen, the difference phase Δφ is dependent upon the distance L7 between the fiber ends and the optical k-vector k, which depends upon the wavelength of the light used.

One advantage of the presently disclosed technology pertains to the size of the fiber waveguide and how such size relates to alignment between detectors. As the size of the detector decreases, the acceptance angle with good optical interference increases. Without wishing to be bound by theory, the strength of the optical heterodyne signal is proportional to the square root of the power of each of the two interfering beams incident on each detector. The photocurrent is proportional to the strength of the optical heterodyne power as shown in Equation IV:

Optical heterodyne power (at the difference frequency)=$2\sqrt{P_1 P_2}$      IV $I$=heterodyne current=alpha*optical heterodyne power=$2*\text{alpha}\sqrt{P_1 P_2}$ where alpha is the responsivity of the detector.

The magnitude of the heterodyne current I is proportional to the optical heterodyne signal, which is proportional to the square root of $P_1$, the power reflected from the end of waveguide 1 and $P_2$, the power of the signal which enters waveguide 1 from the other waveguide Because the reflected power $P_1$ in waveguide 1 is high, an adequate heterodyne photo-current can be generated even by a low amount of power $P_2$ collected from the divergent beam from the other waveguide.

Because of the small effective size of the waveguide, the acceptance and divergence angle of the waveguide is larger. Therefore, precise alignment of the signal and reference detectors is not as critical to perform measurements. In other words, a coherent light beam (reference beam) emitted from a large waveguide must be aligned to a tighter angular tolerance as compared to a smaller diameter beam for effective interference. For example, photodetectors that use visible light (say, 0.5 um wavelength as an example) that are approximately 1 mm in diameter would require an approximate angular alignment tolerance within $4\times10^{-4}$ radians in order to achieve good (efficient) interference in distance measurement.

Photodetectors with an effective size of about 2 microns in size (reference beam widths of about 2 microns), on the other hand, would have an approximate angular tolerance of order 0.1 radians in order to efficiently produce interference. Thus, as the size of the waveguide decreases, the angular acceptance (and emission angle) tolerance increases.

It is noteworthy that once two frequency components of light are combined in a waveguide, they propagate together at the same speed, so that their phase relationship is constant. Therefore it does not matter whether they propagate for a long or short distance. When they finally leave the waveguide and reach a photodetector, the heterodyne signal is the same as that which would have been produced if the detection had been made at or near the entrance of the fiber carrying the two frequency components.

Furthermore, without wishing to be bound by theory, the smaller the diameter of the reference beam from each of the fiber channels, the greater the divergence of the beam can be, thus increasing the divergence angle of the beam and the corresponding lateral range in which the opposite photodetector can be placed to detect interference signals. Hence, choice of optical fiber can be based on the size of the fiber core. Single-mode fibers can have a core with a diameter less than 15 microns or less than 10 microns or approximately 1-2 microns. Single-mode fibers are preferred due to their small core size and the corresponding smaller diameter incidence beam that will increase the diffraction angle of the light emitted and therefore the lateral detection range of the opposite small photodetector. It is also critical that single-mode fibers be used to maintain the phase relationship between the propagating frequency components in the waveguide. The photodetectors in this method do not have to be specialized.

Additionally, because the incident beam can be very small and the divergence angle can be large, two or three dimensional measurements can be made using two, three or more detectors. The interference signals detected by each of the detectors can be used to measure the distance between each of the detectors relative to the other detectors and triangulate the position of any one of the photodetectors relative to the others in three dimensions.

The small size and weight of the fiber elements and the corresponding broad detection ranges and angles can allow the current technology to be applied in a large variety of devices and applications. One of the advantages of the current technology is that it does not require the sophisticated equipment and time constraints for highly accurate beam alignment required by some other interferometric methods. It also uses relatively inexpensive materials for lower cost production. Hence, the current technology can be useful and desirable in many machines, devices and services. In some examples, an interferometer system can be operatively coupled to a machine, such as metrology equipment, manufacturing equipment, robots, vehicles, machining tools and the like. In one aspect, the current technology can be used in metrology to properly calibrate engineering equipment, measurement equipment, and other equipment. In another aspect, the current technology can be used for metrology in micro-fabrication of semiconductors and other similar devices to ensure proper alignment of wafers or other substrates and components, to evaluate surfaces, and to perform any other suitable micro-fabrication tasks. In one aspect, the multiple fibers can be coupled to robotic arms to accurately position the arms relative to a reference frame to grasp or otherwise engage or avoid an object. The robot arms could be part of a stationary robot or as part of an ambulatory robot. The robot could be used in assembly lines, military applications in drones or other equipment, in home consumer products or services, or for various other products and purposes. The robot could have three or more waveguides to give it three dimensional measurement capability, as previously described. One way to accomplish this would be by using one or more than one waveguides attached to the robotic appendages, or other measurable locations on the robot, each with a detector or set of detectors. Additionally, positional information about the robot or other device can be measured by placing one or more waveguides in locations away from the robot or other device. The distance measurement can also be used to measure angles and other geometric quantities. The current technology can also be used in a variety of other devices, systems, and methods. It can also measure velocity, acceleration, etc.

Attention is now directed to FIGS. 7A-8B, which illustrate example embodiments that may be used to determine absolute or relative position, three-dimensional orientation, object dimensions, and the like in accordance with the above-described and additional principles and using unique arrangements of components.

Figure 7A:
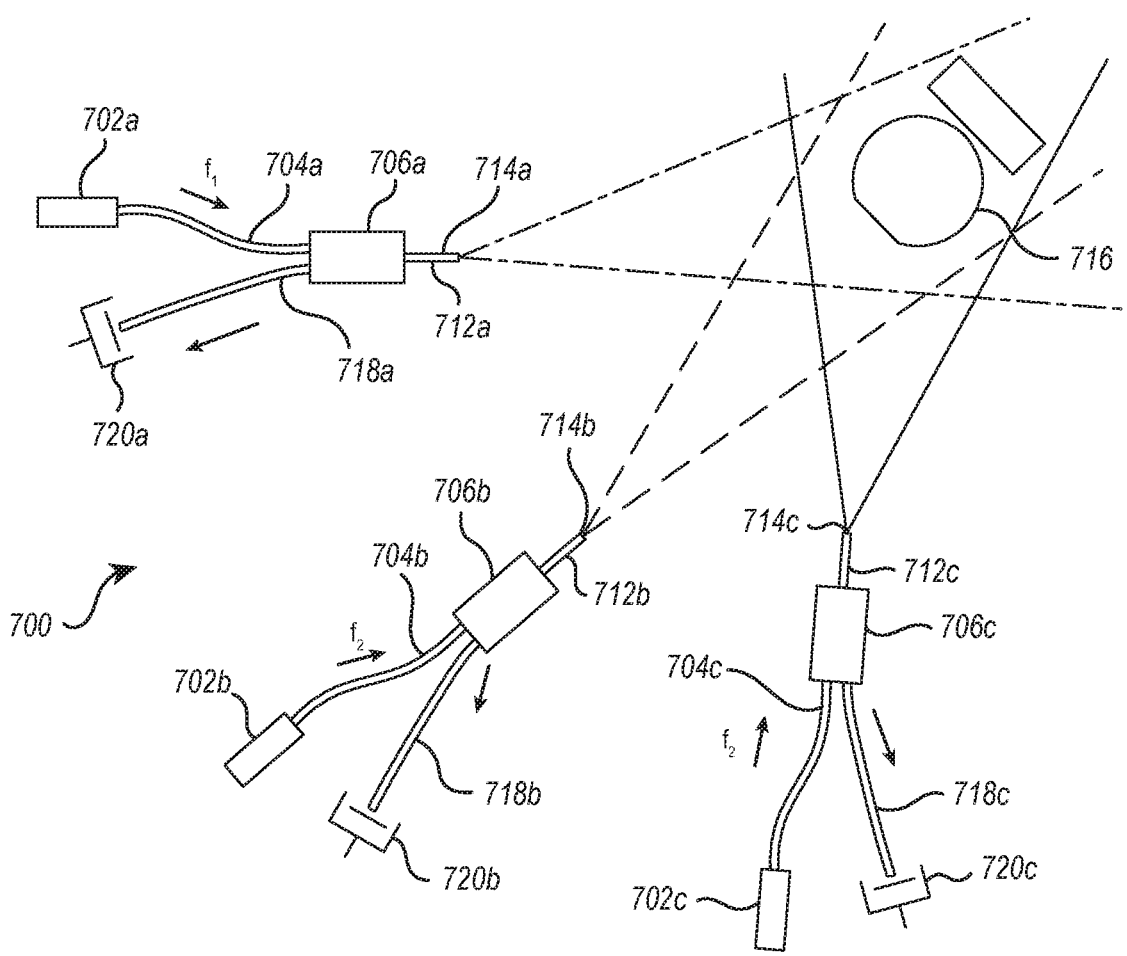
FIG. 7A is a schematic diagram of a system for measuring distance in accordance with an embodiment of the present disclosure.

For instance, FIG. 7A illustrates an example interferometry device 700 that includes a plurality of light sources 702 (702a, 702b, 702c) that generate coherent light along a plurality of associated initial waveguide pathways 704 (704a, 704b, 704c). The initial waveguide pathways 704 (704a, 704b, 704c) direct the light from the light sources 702 (702a, 702b, 702c) into associated fiber couplers 706 (706a, 706b, 706c). In the illustrated embodiment, the fiber couplers 706 (706a, 706b, 706c) are 2-by-1 fiber couplers, meanings that each fiber coupler 706 has two waveguide pathways connected to a first side thereof and one waveguide pathway connected to a second side thereof. The initial waveguide pathways 704 (704a, 704b, 704c) are connected to the first sides of the associated fiber couplers 706 (706a, 706b, 706c). The second side of each of the fiber couplers 706 (706a, 706b, 706c) is connected to a secondary waveguide pathway 712 (712a, 712b, 712c) having a waveguide endpoint 714 (714a, 714b, 714c). In other embodiments, the secondary waveguide pathways 712 may be omitted and the second side of the fiber couplers 706 may include the waveguide endpoints 714. In some embodiments, the length of the secondary waveguide pathways 712 may vary. For instance, the lengths of secondary waveguide pathways 712 may be substantially shorter than illustrated such that waveguide endpoints 714 are positioned (directly) adjacent to fiber couplers 706.

The light from light sources 702 can be directed out of endpoints 714 and towards a retroreflector 716 (e.g. a spherical retroreflector or "cat's eye," for example). In contrast to the spherical retroreflectors 523, 623 discussed above, the retroreflector 716 may be modulated with respect to the any property of coherent light that can be modulated to facilitate distance measurements. Non-limiting examples can include modulating phase, frequency, amplitude, polarization, or any combination thereof. Such techniques of modulation are well known in the art, and any such device is contemplated. As a result of the modulation of the retroreflector 716, the light reflected by the retroreflector 716 will be modulated accordingly.

In the illustrated embodiment, for instance, light source 702a may produce light having a frequency $f_1$ and the retroreflector 716 may modulate the light at a frequency fm so that it is reflected back in harmonics with frequencies of $f_1 \pm fm$, $f_1 \pm 2fm$, $f_1 \pm 3fm$, etc. Similarly, light sources 702b, 702c may produce light having frequencies $f_2$, $f_3$, respectively, and the retroreflector 716 may modulate the light so that it is reflected with frequencies $f_2 \pm fm$, $f_2 \pm 2fm$, $f_2 \pm 3fm$, etc. and $f_3 \pm fm$, $f_3 \pm 2fm$, $f_3 \pm 3fm$, etc. It will be appreciated that fewer or more harmonic frequencies may be produced and/or detected. In some embodiments, only the first two harmonics ($f \pm fm$, $f \pm 2fm$) are used.

In any event, at least some of the reflected light can be reflected back into the pathways 712 via endpoints 714. Additionally, as noted above, a portion of the original light in each pathway 712 is not emitted at endpoints 714, but is reflected back from endpoints 714. Accordingly, the components of light propagating back through pathway 712a may include frequencies of $f_1$, $f_1 \pm fm$, and $f_1 \pm 2fm$ (indicated in FIG. 7A with the arrow pointing towards photodetector 720a). Similarly, the components of light propagating back through pathways 712b and 712c may include frequencies of $f_2$, $f_2 \pm fm$, and $f_2 \pm 2fm$, and $f_3$, $f_3 \pm fm$, and $f_3 \pm 2fm$, respectively (indicated in FIG. 7A with the arrows pointing towards photodetectors 720b, 720c, respectively). The frequencies in each pathway will co-propagate back through the respective pathways 712 and fiber couplers 706.

As noted above, the first side of each fiber coupler has two pathways connected thereto. In addition to the initial pathways 704, the fiber couplers also have pathways 718 (718a, 718b, 718c) coupled thereto. At least portions of the co-propagating components of light may be directed through the associated pathways 718 to photodetectors 720 (720a, 720b, 720c). As discussed above, when the co-propagating components of light reach the associated photodetectors 720, the beams will produce modulated signals in the photodetectors 720 at frequencies fm, 2fm, 3fm, etc. Such signals can be used to measure distance as discussed above.

For instance, the distance between each endpoint 714 and the retroreflector 716 may be determined. When the distance between three or more endpoints 714 and the retroreflector 716 are known, the position of the retroreflector 716 may be determined by triangulation. In some instances, the position of the retroreflector 716 may move. Changes in the reflected light and the photodetector signals can be used to determine magnitude and direction of the change in position of the retroreflector 716. For instance, changes in the amplitude of the photodetector signals can indicate movement of the retroreflector 716 (e.g., whether the amplitude goes up or down and by how much can be used to determine the change in position of the retroreflector 716). The changes in position, including directions, can be determined by photodetector signals because the photodetector signals from the modulated light in the adjacent harmonics (e.g., fm, 2fm) are in quadrature. Furthermore, so long as the retroreflector 716 stays within the emitted light from the end points 714, the position of the retroreflector 716 can be determined.

Figure 7B:
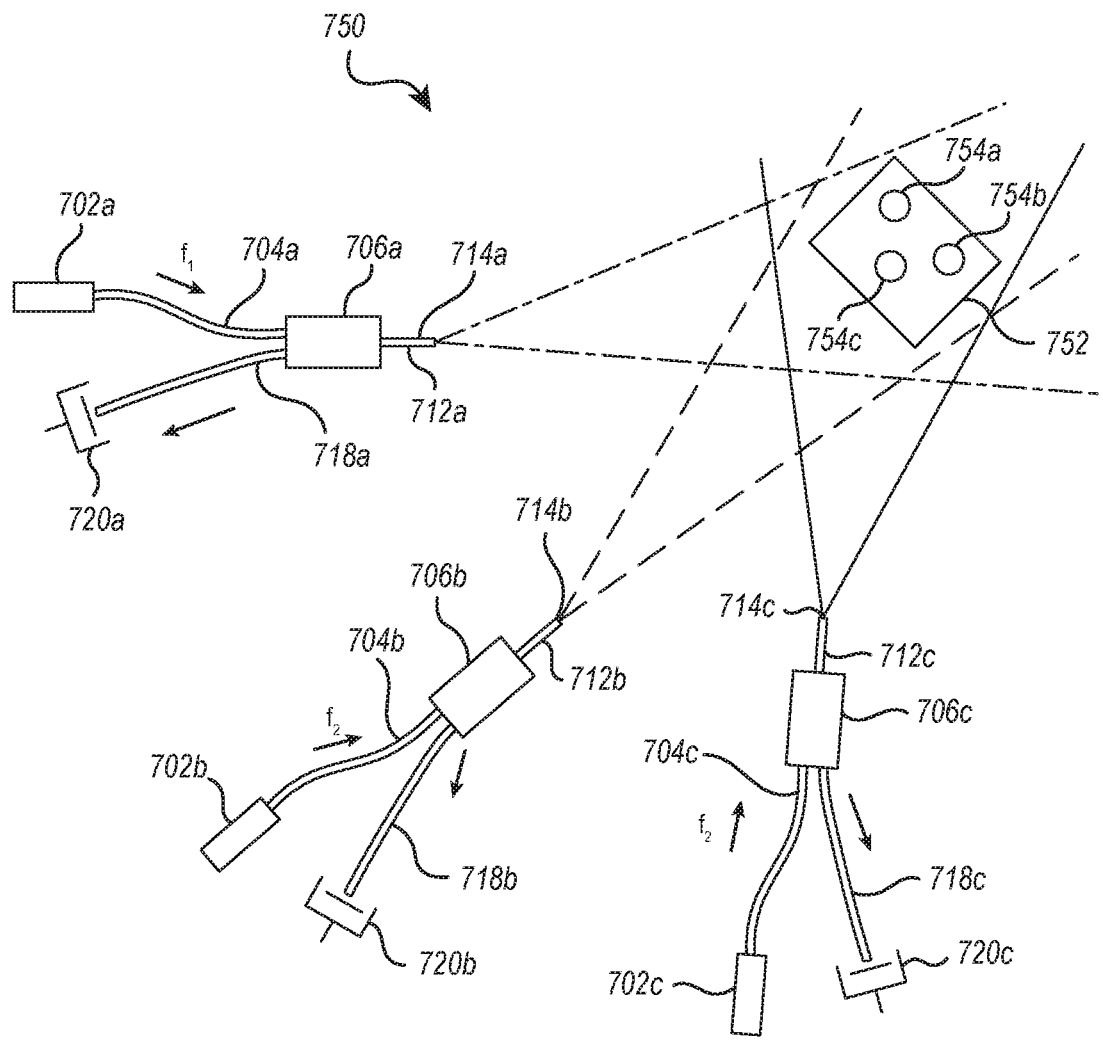
FIG. 7B is a schematic diagram of a system for measuring distance in accordance with an embodiment of the present disclosure.

FIG. 7B illustrates an example interferometry device 750 that is substantially similar or identical to the interferometry device 700. Accordingly, the following discussion of FIG. 7B will focus on those aspects of device 750 that are different from device 700.

As can be seen in FIG. 7B, rather than having a single retroreflector (similar to retroreflector 716 in FIG. 7A), FIG. 7B illustrates a rigid object 752 that has a plurality of retroreflectors 754 (754a, 754b, 754c) mounted thereon. Each of the retroreflectors 754 may be modulated to modulate one or more characteristics of light directed thereon. For instance, some or all of the retroreflectors 754 may modulate the phase, frequency, amplitude, or polarization of light directed thereon. In some embodiments, retroreflectors 754 may modulate different characteristics of light or modulate the same characteristics of light to different degrees or at different frequencies. For instance, one retroreflectors 754 may modulate phase, another may modulate frequency, and another may modulate amplitude. In other embodiments, each retroreflector 754 may modulate phase or frequency, but at different rates for frequencies. For ease of reference, retroreflectors 754a, 754b, 754c will be described as modulating light at frequencies fm1, fm2, fm3, respectively.

In any event, the light emitted from each endpoint 714 may be modulated by each of the retroreflectors 754 and directed back to each endpoint 714. The reflected light may enter the endpoints 714 and co-propagate to the photodetectors along with the original, unmodulated light that was reflected from the endpoints 714. Accordingly, each photodetector 720 may receive a beam made of the original light and components that were modulated and reflected back by the retroreflectors 754. For instance, the photodetector 720a may receive a beam of light having components $f_1$, $f_1 \pm fm1$, $f_1 \pm 2fm1$, $f_1 \pm fm2$, $f_1 \pm 2fm2$, $f_1 \pm fm3$, $f_1 \pm 2fm3$ (indicated in FIG. 7B with the arrow pointing towards photodetector 720a). Similarly, photodetectors 720b and 720c may each receive a beam of light having similar components. However, photodetector 720b will have a component $f_2$ instead of component $f_1$ and photodetector 720c will have a component $f_3$ instead of components $f_1$ or $f_2$.

These beams can be used to determine up to nine separate distances (e.g., between endpoint 714a and each of retroreflectors 754a, 754b, 754c; between endpoint 714b and each of retroreflectors 754a, 754b, 754c; and between endpoint 714c and each of retroreflectors 754a, 754b, 754c). These distances can be used to determine the position of the retroreflectors 754a, 754b, 754c, and by extension, the position (x, y, z) and orientation (pitch, yaw, roll) of the rigid object 752.

Figure 8A:
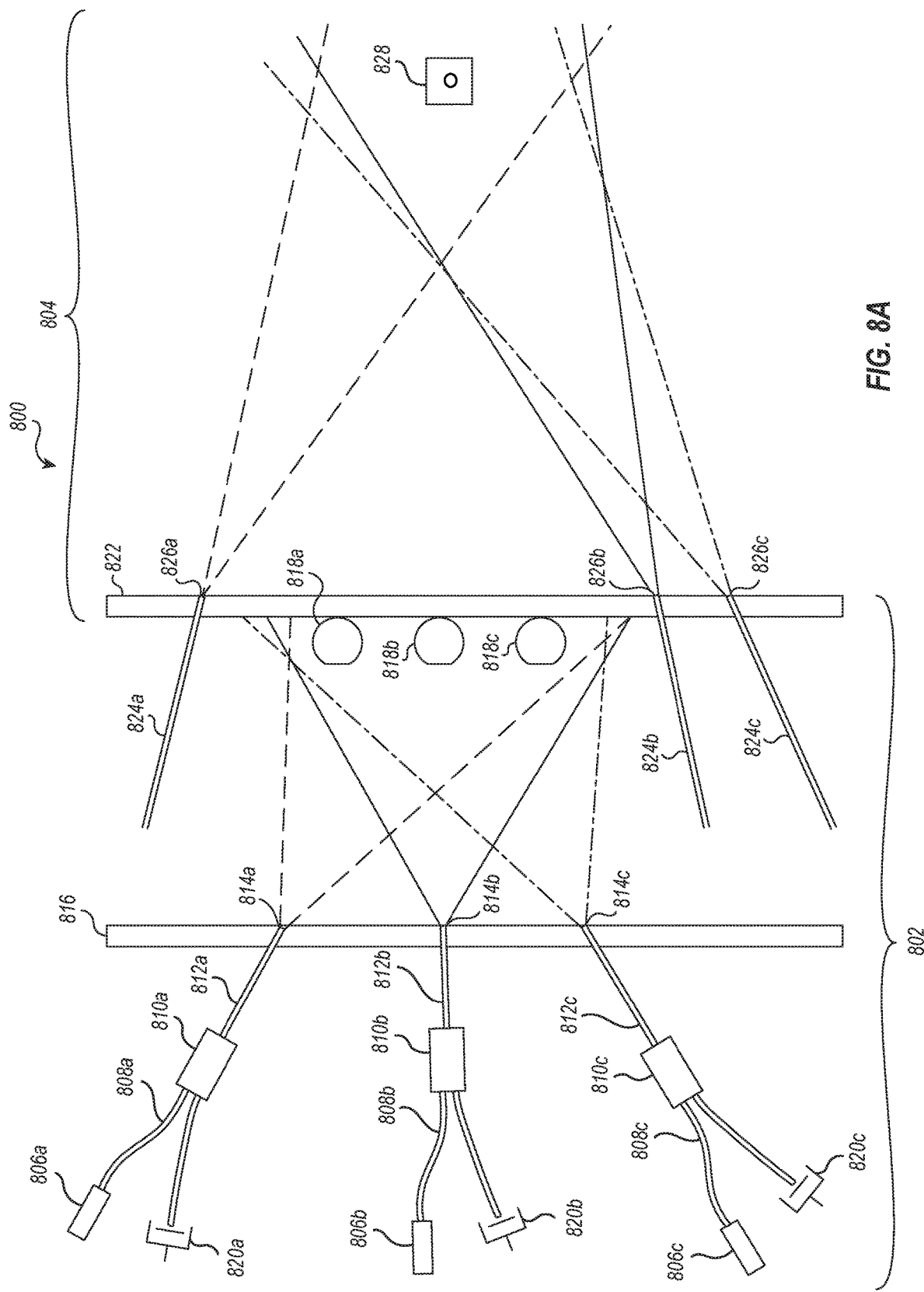
FIG. 8A is a schematic diagram of a system for measuring distance in accordance with an embodiment of the present disclosure.

Attention is now directed to FIG. 8A, which illustrates an example two-stage interferometry device 800 that can be used to scan typically larger areas than the interferometry devices discussed above. The illustrated device 800 includes a first stage 802 and a second stage 804. The first stage 802 is similar in many respects to device 750 discussed above. For instance, the first stage 802 includes a plurality of light sources 806 (806a, 806b, 806c) that generate coherent light along a plurality of associated initial waveguide pathways 808 (808a, 808b, 808c). The initial waveguide pathways 808 (808a, 808b, 808c) direct the light from the light sources 806 (806a, 806b, 806c) into associated fiber couplers 810 (810a, 810b, 810c). In the illustrated embodiment, the fiber couplers 810 (810a, 810b, 810c) are 2-by-1 fiber couplers, meanings that each fiber coupler 810 has two waveguide pathways connected to a first side thereof and one waveguide pathway connected to a second side thereof. The initial waveguide pathways 808 (808a, 808b, 808c) are connected to the first sides of the associated fiber couplers 810 (810a, 810b, 810c). The second side of each of the fiber couplers 810 (810a, 810b, 810c) is connected to a secondary waveguide pathway 812 (812a, 812b, 812c) having a waveguide endpoint 814 (814a, 814b, 814c). In other embodiments, the lengths of the secondary waveguide pathways 812 may vary or be omitted. For instance, the lengths of secondary waveguide pathways 812 may be substantially shorter than illustrated such that waveguide endpoints 814 are positioned (directly) adjacent to fiber couplers 810 or such that the second side of the fiber couplers 810 may include the waveguide endpoints 814.

In the illustrated embodiment, the endpoints 814 are connected to a reference plate 816. In some embodiments, the reference plate 816 may be a rigid plate having a known position and orientation. In other embodiments, the end points 814 may be connected to a plurality of reference plates. For instance, each end point 814 may be connected to its own reference plate. In still other embodiments, the endpoints 814 may not be connected to a reference plate, but may still have a known position and orientation.

In any event, the light from light sources 806 can be directed out of endpoints 814 and towards a plurality of retroreflectors 818 (818*a*, 818*b*, 818*c*). As with retroreflectors 716, 754 discussed above, the retroreflectors 818 may be modulated with respect to the any property of coherent light that can be modulated to facilitate distance measurements. Non-limiting examples can include modulating phase, frequency, polarization, amplitude, or any combination thereof. Such techniques of modulation are well known in the art, and any such device is contemplated. As a result of the modulation of the retroreflectors 818, the light reflected by the retroreflectors 818 will be modulated accordingly. The modulated light returns back into the endpoints 814 and to associated photodetectors 820 (820*a*, 820*b*, 820*c*) in the same or similar manner discussed above in connection with FIG. 7B.

In the illustrated embodiment, the retroreflectors 818 are mounted on a rigid gimble plate 822. The gimble plate 822 can rotate and/or pivot about one or more axes. As the gimble plate 822 rotates and/or pivots, the distances between the endpoints 814 and the retroreflectors 818 will change. These changing distances can be determined in accordance with the principles described herein. As a result, the orientation and/or position of the gimble plate 822 can be determined. Accordingly, the first stage 802 can be used to ascertain and/or monitor the position and/or orientation of the gimble plate 822 using the nine distance measurements between the fiber ends 814 and the retroreflectors 818.

The second stage 804 employs the movement of the gimble plate 822 to scan larger areas than is typically achievable with interferometry devices, including those discussed above. As noted above, light emitted from an endpoint of only a single fiber may have a divergence half angle of about 0.1 radians. Accordingly, in order to access an area of about 1 square meter, the endpoint would have to be positioned about 5 meters away from the area in order to allow the light to spread out enough to cover the area. In contrast, using a two-stage interferometry device as discussed herein, the distance between the gimble fiber endpoints and the to-be-scanned area can be dramatically reduced. The extent of the reduction will depend, at least in part, on the range of motion of the gimble plate 822. Before proceeding further, a description of the second stage 804 will be provided.

Similar to the first stage 802, the second stage 804 includes a plurality of light sources (not shown) and a plurality of photodetectors (not shown). Each light source and photodetector is associated with a waveguide pathway 824 (824*a*, 824*b*, 824*c*) having an endpoint 826 (826*a*, 826*b*, 826*c*). The endpoints 826 are connected to the gimble plate 822 such that movement of the gimble plate 822 results in movement of the endpoints 826. Light from the light sources can be directed out of the endpoints and towards a target 828. Modulated light reflected back from the target 828 can enter into the endpoints 826 and propagate to the photodetectors associated with the endpoints 826 (along with a reflected portion of the original light from the light sources).

As before, the interference signals from the reflected light can be used to determine the distance between each endpoint 826 and the target 828.

Using triangulation, the 3D position of the target 828 can then be determined relative to the gimble plate 822, and particularly the fiber endpoints 826 thereon. Once the position of the target 828 is known relative to the fiber endpoints 826 on the gimble plate 822, the position of the target 828 relative to the reference plate 816 can be determined using mathematical relations. In particular, the position and/or orientation of the gimble plate 822 can be determined using the first stage 802. The positions of the endpoints 826 relative to the fixed retroreflectors 818 on the gimble plate 822 can be known by pre-calibration as discussed elsewhere herein. With that known, as well as the position of the target 828 relative to the gimble plate 822, the position and orientation of the target 828 can be determined relative to the reference plate 816.

Although not illustrated, it will be appreciated that a lens may be positioned in front of any of the endpoints 814, 826 (or any of the other endpoints disclosed herein) to reduce the divergence or to collimate the beams emitted therefrom. Reducing the divergence or collimating the emitted beams can increase the intensity of the beams on the targets.

Although FIG. 8A illustrates the target 828 centered with the device 800 and as being relatively small, the target 828 may move relative to the device 800 and/or may be significantly larger. In such cases, the light emitted from the endpoints 826 may need to be redirected in order to shine on the target 828 or desired portions thereof. Accordingly, the gimble plate 822 can rotate and/or pivot about one or more axes in order to direct the light emitted from endpoints 826 over a larger region in order to illuminate on a moving target 828 and/or a portion of a larger target 828.

In some embodiments, the gimble plate 822 may have a range of motion that allows the gimble plate 822 to rotate about one or more axes up to about 150°. For instance, from the neutral position/orientation shown in FIG. 8A, the gimble plate 822 may rotate about 75° in either direction about an axis (for a total of about 150°). In other embodiments, the gimble plate 822 may rotate about an axis more than 150°, up to about 120°, 100°, 90°, 60°, 50°, or 25°, less than 25°, or in any range between any of the foregoing values. For instance, some embodiments, the gimble plate 822 may rotate about one or more axes up to about 360°. In such embodiments, the gimble plate 822 may be associated with multiple reference plates 816 disposed about the gimble plate 822. Each of the reference plates may include multiple endpoints 814 that direct light at the retroreflectors 818 for monitoring or detecting the position/orientation of the gimble plate 822. Alternatively, or additionally, the gimble plate 822 may include additional retroreflectors thereon. The additional retroreflectors may be "seen" by the endpoints 814 on the reference plate 816 when the gimble plate 822 rotates far enough that the endpoints 814 on the reference plate 816 cannot "see" the illustrated retroreflectors 818. For instance, the gimble plate 822 may include or have connected thereto a cylindrical surface upon which multiple retroreflectors are mounted and which can be "seen" by the endpoints 814 regardless of the degree to which the gimble plate 822 is rotated. Furthermore, the neutral position of the gimble plate 822 may not be located at the center of the range of motion. Additionally, the gimble plate 822 may have the same or different ranges of motion about different axes.

Prior to use of the device 800, various components thereof may be pre-calibrated. For instance, the relative positions of the endpoints 814a-c, retroreflectors 818a-c, and endpoints 826a-c may be determined. The pre-calibration can be accomplished in a variety of ways. By way of example, and similar to the method discussed above, a moveable fiber can be used to detect the endpoints 814a-c and retroreflectors 818a-c and triangulation methods can be employed to determine that actual positions thereof (including their positions relative to one another). The relative positions of the endpoints 814a-c can be determined with a movable fiber emitting a single wavelength. For instance, the movable fiber can be used to determine the position of one of the endpoints 814a-c. From there, the movable fiber can be used to determine the positions of the other endpoint 814a-c in the same reference frame, such that the relative positions of the endpoints 814a-c can be determined. Alternatively, the relative positions of the endpoints 814a-c can be determined with one or more movable fibers employing absolute distance interferometry (e.g., emitting multiple wavelengths).

After calibration, with the positions of the retroreflectors 818a-c known, the positions of the endpoints 826a-c can be determined. One method of determining the positions of the endpoints 826a-c can include directing light from the endpoints 826a-c onto an object or objects that has or have a known fixed position or positions. The gimble plate 822 can then be moved, which will result in changes in the distances between the endpoints 826a-c and the fixed object. Using the changes in the distances and the known movements of the retroreflectors 818a-c (via movement of the gimble plate 822), the positions of the endpoints 826a-c can be determined by triangulation.

Figure 8B:
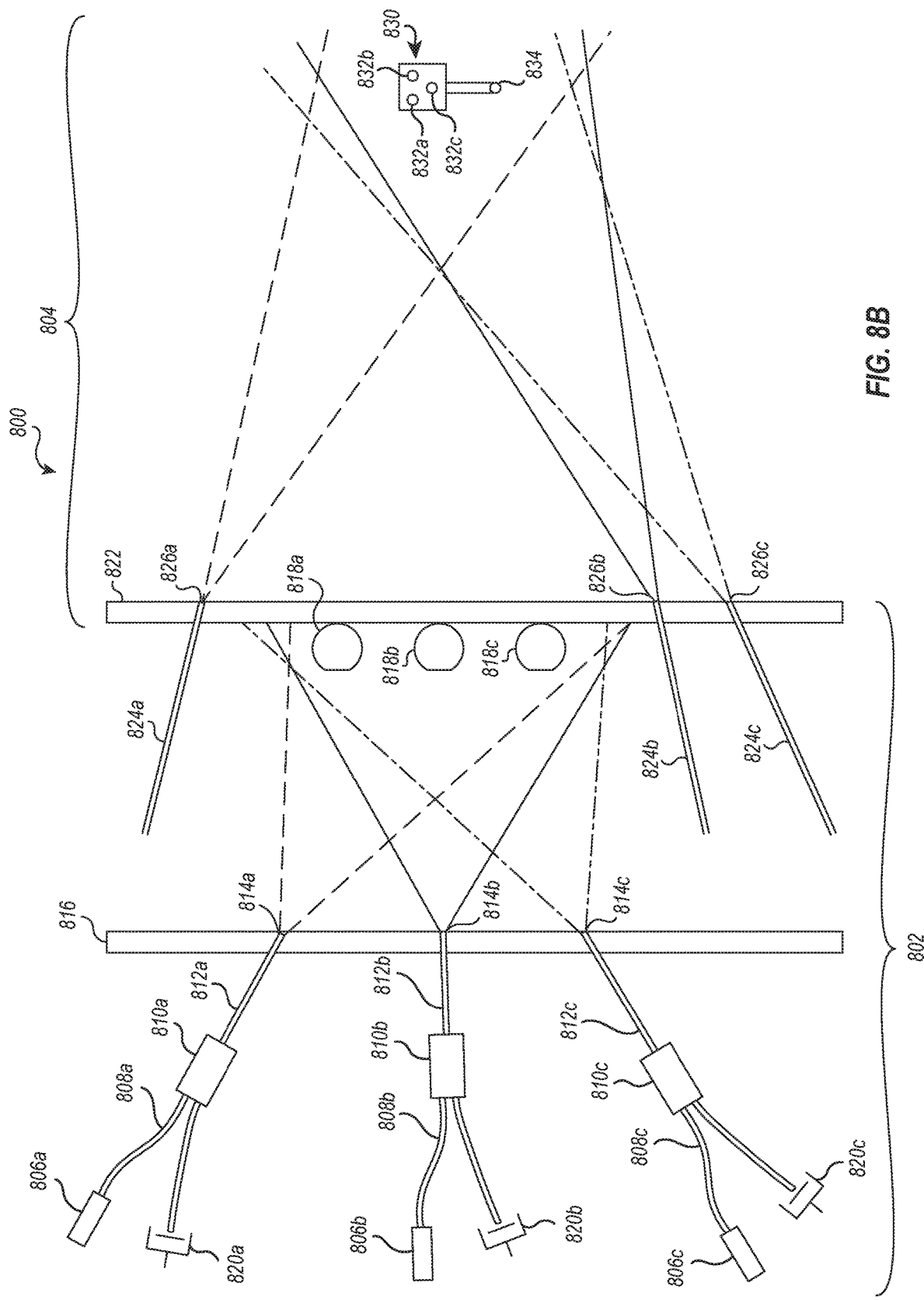
FIG. 8B is a schematic diagram of a system for measuring distance in accordance with an embodiment of the present disclosure.

Attention is now directed to FIG. 8B, which illustrates the device 800 again. The embodiment of FIG. 8B is the same as the embodiment of FIG. 8A except that target 828 is replaced with target 830. As can be seen, target 830 includes a plurality of retroreflectors 832 (832a, 832b, 832c). With a plurality of retroreflectors 832, not only can the position of the target 830 be ascertained, but the orientation of the target 830 can also be ascertained, similar to the manner discussed above in connection with FIG. 7B and the first stage 802 of FIG. 8A (e.g., by determining the distances between each of the waveguide endpoints 826 and each of the retroreflectors 832).

In some embodiments, the target 830 may also include a probe 834 rigidly attached thereto. The target 830 may be moved so a tip of the probe 834 contacts a desired object or a point on an object. The tip of the probe 834 may be positioned with a known (pre-calibrated) 3D position relative to the plurality of retroreflectors 832. Accordingly, by determining the position and/or orientation of the plurality of retroreflectors 832, the position and/or orientation of the probe 834 (and particularly the tip thereof) can be ascertained. It will be appreciated that the probe 834, or the tip thereof, may comprise various components, such as a camera, optical scanning device, or other mechanical device.

It will be appreciated that multiple devices 800 could be employed to determine the position and/or orientation of the target 830 and associated probe 834. For instance, multiple devices 800 could be employed to detect the target 830 in the event that the retroreflectors 832a-c are facing away from one device 800 and towards another device 800. In other embodiments, the target 800 may include retroreflectors 832 disposed around multiple sides thereof so as to be visible by the endpoints 826a-c regardless of the orientation of the target 830.

As discussed in connection with FIG. 8A, the device 800 as shown in FIG. 8B or components thereof may be pre-calibrated. The methods of pre-calibrating the device 800 or components thereof may be similar or identical to those described above. In addition to the pre-calibrations discussed above, the positions of the retroreflectors 832a-c and the probe 834 can be determined, and particularly relative to one another. In order to determine the positions of the retroreflectors 832a-c, a movable fiber (with a known location) can be used to detect each of the retroreflectors 832a-c and triangulation methods can be employed to determine the positions of each of the retroreflectors 832a-c. Once the positions of each of the retroreflectors 832a-c is known, the relative position of the retroreflectors 832a-c can be determined relative to one another and relative to each of the endpoints 826a-c.

With the positions of the retroreflectors 832a-c known, the position of the probe 834 can be determined (particularly relative to the retroreflectors 832a-c). One method for determining the position of the probe 834 relative to the retroreflectors 832a-c is to position the probe in a known location (e.g., in a conical hole) and move the retroreflectors 832a-c in a way that keeps the position of the probe 834 constant. By monitoring the movements of the retroreflectors 832a-c using triangulation, the fixed position of the probe 834 can be determined using stage 800.

Figure 8C:
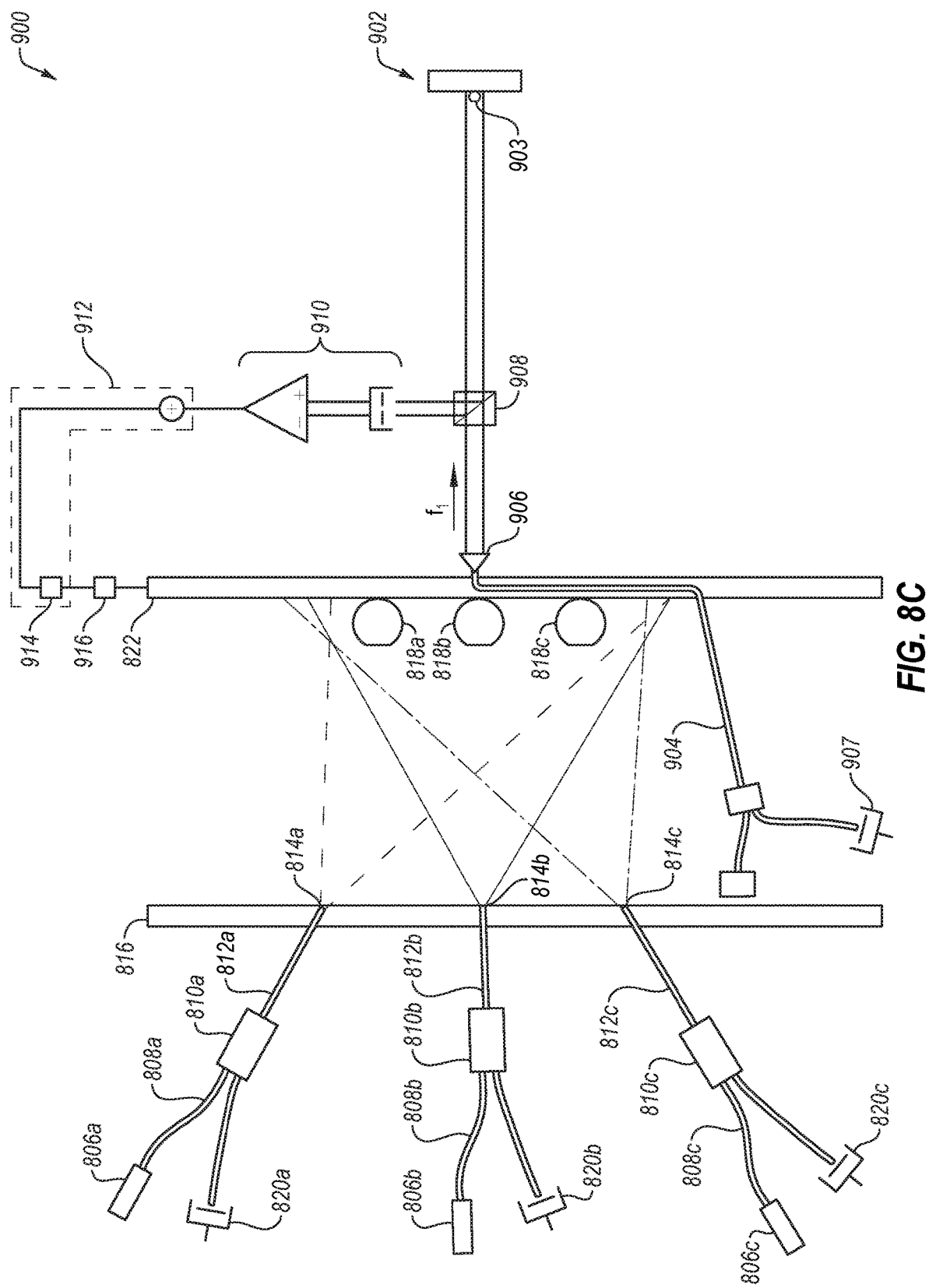
FIG. 8C is a schematic diagram of a system for measuring distance in accordance with an embodiment of the present disclosure.

Attention is now directed to FIG. 8C, which illustrates a device 900 that is similar to or the same as the device 800 in FIGS. 8A and 8B in many respects. Accordingly, the following discussion of device 900 will focus on the aspects of device 900 that are unique compared to the device 800 discussed above.

The device 900 can be used to detect the 3D position of a target 902 that has a retroreflector 903 thereon. However, the specific method used to detect the position of the target 902 differs, at least partially, from the methods used in connection with the device 800. Similar to the device 800, the device 900 includes a reference plate 816 and a gimble plate 822 and the associated light sources 806, endpoints 814, retroreflectors 818, photodetectors 820, etc. for determining the position and orientation of the gimble plate 822.

In contrast to the device 800, however, the gimble plate 822 has a single waveguide pathway 904 having an endpoint 906. The endpoint 906 can direct a beam of light with a frequency $f_1$ towards the target 902 (and particularly towards the retroreflector 903 thereon). Between the endpoint 906 and the target 902, the light can pass through a beam splitter 908. The beam splitter 908 will allow part of the light to continue on to the target 902, while redirecting the returning light to a position sensitive photodetector 910.

The portion of the light that is directed to the target 902 will interact with the retroreflector 903. The retroreflector 903 will modulate the light (as discussed elsewhere herein (e.g., such that the modulated light has a frequency of $f_1 \pm fm$, $f_1 \pm 2fm$)) and direct the modulated light back to the beam splitter 908.

The beam splitter 908 will allow a portion of the modulated light to pass therethrough and enter back into the endpoint 906. As with previous embodiments, the modulated light entering back into the endpoint 906 (along with an internally reflected portion of the original light) will be directed back to a photodetector 907. The interference of the original light and the modulated reflected light can be used as before to determine the distance between the endpoint 906 and the target 902.

Additionally, the beam splitter 908 will direct at least a portion of the reflected light to the position sensitive photodetector 910. The position sensitive photodetector 910 can determine whether the outgoing beam is centered on the retroreflector 903. For instance, the position sensitive photodetector 910 may include a four-quadrant detector that can determine displacement (e.g., horizontal, vertical) of the returning light, which indicates the centeredness of the outgoing light on the retroreflector 903. If the outgoing light is not centered with the retroreflector 903, then the differences of the signals in the four quadrants of the four-quadrant detector will have non-zero values. In contrast, if the outgoing light is centered with the retroreflector 903, then the differences of the signals in the four quadrants of the four-quadrant detector will have zero values.

The position signals produced by the four-quadrant detector can be used to lock the gimble plate 822 (and more specifically the light from endpoint 906) onto the target 902, similar to laser trackers known in the art. For instance, the position signals produced by the four-quadrant detector can be communicated to a feedback loop 912. If any of the position signals produced by the four-quadrant detector is non-zero (meaning that the light is not centered on retroreflector 903), then the feedback loop 912 can activate a motor controller 914 that will control one or more motors 916 associated with the gimble plate 822. For instance, if the four-quadrant detector determines that the light is not centered on the retroreflector 903, the feedback loop 912 (and particularly the motor controller 914 thereof) can cause the one or more motors 916 associated with the gimble plate 822 to reorient the gimble plate 822 to center the light on the retroreflector 903 (e.g., so that the difference signals determined by the four-quadrant detector are zero). In this way, the position sensitive photodetector 910 and the feedback loop 912 can lock the light so it is centered on the retroreflector 903 in order to track the movements of the target 902. By determining the distance between the endpoint 906 and the target 902 from photodetector 907 as well as the orientation of the gimble plate 822, the three-dimensional position of the target 902 can be determined.

In some embodiments, orientation information about the target 902 can also be obtained. For instance, the target 902 may include three or more retroreflectors (e.g., retroreflector 903 and two additional retroreflectors) thereon. The three-dimensional position of the target 902 may be determined as described above based on the modulated light from the retroreflector 903). Additionally, the distances between the endpoint 906 and the additional two retroreflectors can be used to determine the orientation of the target.

It will be noted that this method may also be able to detect certain orientation information about the target. By way of example, if the target pivots or rotates towards or away from the endpoint 906, this noted method could detect such movements and thereby determine changes in the orientation of the target.

In some embodiments, the systems disclosed herein may be used to measure relative position or displacement of a target (or retroreflector(s) thereon) relative to the waveguide endpoints. By way of example, referring to the embodiment of FIG. 7A, the relative position of the target 716 compared to the endpoints 714*a-c* may be determined using single wavelength light sources 702*a-c* and fringe counting methods known in the art. In particular, as the target moves closer to or further from the endpoints, fringe counting methods known in the art can be employed to determine the relative change in position or displacement of the target.

As is understood, fringe counting methods have certain drawbacks or limitations. Additionally, in some cases, it may be desirable to determine the absolute distance between the endpoints and the target. Accordingly, the disclosed embodiments may be used to determine the absolute distances between the endpoints and the targets. In some cases, as discussed below, the disclosed embodiments may be modified to provide the capability to determine the absolute distance or position of a target. It will be appreciated that the following methods for measuring absolute distances are known in the art. Accordingly, only brief descriptions of these methods are provided. Furthermore, other methods for measuring absolute distances may be employed.

One method for determining the absolute distance between an endpoint and a target is by using multiple lights sources with difference wavelengths for each endpoint. For instance, referring to FIG. 8A, endpoint 814*a* may be associated with at least two light sources (rather than just light source 806*a*). The two light sources may produce light having wavelengths that are different from one another, although the wavelengths may be only slightly different from one another. Similarly, each of endpoints 814*b*, 814*c* may be associated with multiple light sources rather than just light sources 806*b*, 806*c*. The multiple light sources associated with each of the endpoints 814*b*, 814*c* may emit light having different wavelengths from one another. In addition to having multiple light sources associated with each endpoint, each endpoint may also be associated with multiple photodetectors and a wavelength dispersive element such as a diffraction grating or filter (as opposed to individual photodetectors as shown in the figures). When two light sources (that produce light with different wavelengths) are used with each endpoint, the phase difference between the two wavelengths can be used to determine the absolute distance between the endpoint and the target, rather than just the displacement of the target.

Another method for determining the absolute distance between an endpoint and a target may include using a variable wavelength light source. This method may include scanning the frequency of the light produced by the variable wavelength light source and measuring the change in phase due to the frequency change when the target is stationary. With this information, the absolute distance between the endpoint and the target can be measured when the target moves.

The embodiments disclosed herein may be used in connection with a broad array of technologies. For instance, the disclosed embodiments may be used in or as coordinate measuring machines (e.g., to verify part tolerances), CNC and 3d printing machines (e.g., for calibration and/or monitoring position of machine tool location or parts), lithography, scanning electron microscope (e.g., calibration), precision X, Y, Z stages, wavelength measurement, and monitoring/detecting expansion/contraction of materials (e.g., during heating or cooling). Additionally, embodiments disclosed herein may also be used to calibrate a coordinate measuring machine and 3D positioning systems.

A number of non-limiting examples of the present interferometer system and associated methods will now be described:

In one example, an interferometry system can include a coherent light source operable to generate a beam of coherent light, separate waveguide pathways optically associated with the coherent light source, a photodetector optically associated with each waveguide pathway, and a transceiving segment optically associated with each waveguide pathway at a location between the coherent light source and the photodetector, each transceiving segment being configured to emit an emitted beam of coherent light and positioned to receive a received portion of an emitted beam of coherent light emitted from a transceiving segment optically associated with a different waveguide pathway, the received portion being combined with coherent light from the waveguide pathway receiving the received portion to form an optical interference signal, wherein each waveguide pathway is configured to direct a separate optical interference signal toward a respective photodetector.

In some examples, the coherent light source can include a plurality of coherent light sources.

In some examples, each of the plurality of light sources is configured to emit a beam of coherent light at a unique wavelength.

In some examples, the coherent light source is operable to emit a beam of coherent light having a wavelength of from 400 nm to 2000 nm.

In some examples, each of the separate waveguide pathways comprises a single mode optical fiber.

In some examples, each of the separate waveguide pathways can include a first waveguide segment and a second waveguide segment.

In some examples, the first waveguide segment is configured to direct the beam of coherent light to the transceiving segment.

In some examples, the second waveguide segment is configured to direct the optical interference signal to the respective photodetector.

In some examples, the photodetector is a photodiode having a p-n junction, a photodiode having a p-i-n junction, or combination thereof.

In some examples, the system further includes an optical modulator positioned to modulate the beam of coherent light directed through one or more of the separate waveguide pathways.

In some examples, the optical modulator includes a member selected from the group consisting of an acousto-optic modulator, an electro-optic modulator, a magneto-optic modulator, a mechano-optic modulator, a phase-shifter, and a combination thereof.

In some examples, the optical modulator includes a plurality of optical modulators optically associated with separate waveguide pathways.

In some examples, the system further includes a beam splitter positioned to split the beam of coherent light into a plurality of component beams, each of which is directed down a separate waveguide pathway.

In some examples, the system further includes a reflective surface positioned to direct a reflected portion of the emitted beam toward the transceiving segment from which the emitted beam is emitted.

In some examples, the reflective surface is a retroreflector.

In some examples, the system further includes a beam splitter positioned to direct a plurality of split emitted beams toward the reflective surface.

In some examples, the beam splitter is a polarizing beam splitter.

In some examples, the system further includes a quarter wave plate positioned to manipulate the split emitted beams.

In some examples, the system further includes a lens positioned to focus the split emitted beams toward the reflective surface.

In some examples, the system further includes a lens positioned proximate to a plurality of transceiving segments to direct the reflected portion into the plurality of transceiving segments.

In some examples, the system further includes a lock-in amplifier operatively coupled to one or more photodetectors.

In some examples, a separate lock-in amplifier is operatively coupled to each photodetector.

In some examples, a method of determining a distance between a plurality of points can include directing a beam of coherent light along separate waveguide pathways toward a photodetector optically associated with each separate waveguide pathway, each waveguide pathway further comprising a transceiving segment optically associated therewith, emitting an emitted beam from transceiving segments in separate waveguide pathways, receiving a received portion of the emitted beam at a transceiving segment optically associated with a different waveguide pathway from which the emitted beam was emitted, and wherein the received portion is combined with coherent light in the waveguide pathway receiving the received portion to form an optical interference signal, delivering separate optical interference signals to respective photodetectors to generate a local photocurrent at each respective photodetector, and relating a difference between the local photocurrents at each photodetector to a distance between the transceiving segments of the separate waveguide pathways.

In some examples, directing includes splitting the beam of coherent light into separate component beams and directing each component beam along separate waveguide pathways.

In some examples, the beam of coherent light includes a plurality of beams of coherent light generated from separate coherent light sources.

In some examples, each of the plurality of beams of coherent light has a unique wavelength.

In some examples, the method further includes modulating the beam of coherent light in at least one of the separate pathways.

In some examples, the method further includes directing the emitted beam toward a reflective surface to form a reflected portion of the emitted beam that is directed toward the same transceiving segment from which it is emitted, a transceiving segment of a separate pathway, or both.

In some examples, the method further includes splitting the emitted beam and directing a split emitted beam toward the reflective surface.

In some examples, the method further includes polarizing the emitted beam to form a polarized split emitted beam.

In some examples, the method further includes focusing the emitted beam toward the reflective surface using a lens.

In some examples, the method further includes directing the reflected potion of the emitted beam toward a plurality of transceiving segments using a lens.

In some examples, each separate waveguide pathway comprises a first waveguide segment and a second waveguide segment.

In some examples, the beam of coherent light is directed to the associated transceiving segment via the first waveguide segment.

In some examples, the second waveguide segment is configured to direct the optical interference signal to the respective photodetector.

In some examples, at least one photodetector is a reference photodetector having a fixed position.

In some examples, the local photocurrent is detected using a lock-in amplifier.

In some examples, the lock-in amplifier includes a separate lock-in amplifier at each photodetector.

In some examples, an interferometry system comprising: a plurality of coherent light sources, each light source of the plurality of light sources being operable to generate a beam of coherent light; separate waveguide pathways optically associated with each coherent light source of the plurality of coherent light sources, each separate waveguide pathway having an endpoint configured to emit at least a portion of the beam of coherent light from the associated light source; a plurality of photodetectors, at least one photodetector of the plurality of photodetectors optically associated with each waveguide pathway; and a retroreflector configured to receive the light emitted from each of the endpoints, modulate the received light, and direct the modulated light back to the endpoints, wherein each of the waveguide pathways directs an optical interference signal to the associated photodetector, the optical interference signal being formed of the modulated light received by the endpoint of the waveguide pathway and a portion of the coherent light from the waveguide pathway receiving the modulated light, wherein each waveguide pathway is configured to direct a separate optical interference signal toward a respective photodetector.

In some examples, each of the plurality of light sources is configured to emit a beam of coherent light at a unique wavelength.

In some examples, the coherent light source is operable to emit a beam of coherent light having a wavelength of from 400 nm to 1000 nm.

In some examples, each of the separate waveguide pathways comprises a fiber coupler.

In some examples, each fiber coupler comprises a first side and a second side, the first side having two waveguide pathways connected thereto, and the second side having one waveguide pathway connected thereto.

In some examples, each coherent light source is optically coupled to a first waveguide pathway of the two waveguide pathways and each photodetector is optically coupled to a second waveguide pathway of the two waveguide pathways.

In some examples, the one waveguide pathways connected to the second sides of the fiber couplers comprises the endpoints.

In some examples, the retroreflector is configured to phase modulate the light emitted from each of the endpoints.

In some examples, the retroreflector comprises a plurality of retroreflectors mounted on a rigid object.

In some examples, each of the plurality of retroreflectors is configured to receive the light emitted from each of the endpoints, modulate the received light, and direct the modulated light back to the endpoints, wherein each of the waveguide pathways directs an optical interference signal to the associated photodetector, the optical interference signal being formed of the modulated light from each of the plurality of retroreflectors and received by the endpoint of the waveguide pathway.

In some examples, a method of determining a position of an object, comprises: directing first, second, and third beams of coherent light along respective first, second, and third waveguide pathways; emitting a portion of the first, second, and third beams of coherent light from respective first, second, and third endpoints associated with the respective first, second, and third waveguide pathways; receiving the emitted portions of the first, second, and third beams of coherent light at a retroreflector; modulating the emitted portions of the first, second, and third beams of coherent light to form first, second, and third modulated beams; directing the first modulated beam and a portion of the first beam of coherent light to a first photodetector to generate a first photocurrent; directing the second modulated beam and a portion of the second beam of coherent light to a second photodetector to generate a second photocurrent; directing the third modulated beam and a portion of the third beam of coherent light to a third photodetector to generate a third photocurrent; and relating a difference between the first, second, and third photocurrents at the first, second, and third photodetectors to a distance between each of the first, second, and third endpoints and the retroreflector.

In some examples, directing the first modulated beam and a portion of the first beam of coherent light to a first photodetector comprises directing the first modulated beam and the portion of the first beam of coherent light align the first waveguide pathway.

In some examples, modulating the emitted portions of the first, second, and third beams of coherent light comprises modulating at least one of the phase, frequency, or amplitude of the first, second, and third beams of coherent light.

In some examples, receiving the emitted portions of the first, second, and third beams of coherent light at a retroreflector comprises receiving each of the emitted portions of the first, second, and third beams of coherent light at a plurality of retroreflectors.

In some examples, modulating the emitted portions of the first, second, and third beams of coherent light to form first, second, and third modulated beams further comprises modulating the emitted portions of the first, second, and third beams of coherent light to form fourth, fifth, sixth, seventh, eighth, and ninth modulated beams.

In some examples, a two-stage interferometry system, comprises: a first stage, comprising: a plurality of coherent light sources, each light source of the plurality of light sources being operable to generate a beam of coherent light; separate waveguide pathways optically associated with each coherent light source of the plurality of coherent light sources, each separate waveguide pathway having an endpoint configured to emit at least a portion of the beam of coherent light from the associated light source; a plurality of photodetectors, at least one photodetector of the plurality of photodetectors optically associated with each waveguide pathway; a gimble plate selectively movable about one or more axes; and a plurality of retroreflectors mounted on the gimble plate and configured to receive the light emitted from each of the endpoints, modulate the received light, and direct the modulated light back to the endpoints, wherein each of the waveguide pathways directs an optical interference signal to the associated photodetector, the optical interference signal being formed of the modulated light received by the endpoint of the waveguide pathway and a portion of the coherent light from the waveguide pathway receiving the modulated light. The second stage comprises: a second plurality of coherent light sources, each light source of the second plurality of light sources being operable to generate a beam of coherent light; separate waveguide pathways optically associated with each coherent light source of the second plurality of coherent light sources, each separate waveguide pathway having an endpoint configured to emit at least a portion of the beam of coherent light from the associated light source of the second plurality of light sources, the endpoints of the separate waveguide pathways of the second stage being connected to the gimble plate such that movement of the gimble plate moves the endpoints connected thereto; and a second plurality of photodetectors, at least one photodetector of the second plurality of photodetectors optically associated with each waveguide pathway of the second stage.

In some examples, the first stage further comprises a stationary reference plate to which endpoints of the first stage waveguide pathways are connected.

In some examples, movement of the gimble plate about the one or more axes changes the direction in which light is emitted from the endpoints of the second plurality of waveguide pathways.

In some examples, the second stage further comprises a second plurality of retroreflectors mounted on rigid object and configured to receive the light emitted from each of the endpoints of the second plurality of waveguide pathways, modulate the received light, and direct the modulated light back to the endpoints of the second plurality of waveguide pathways, wherein each of the second plurality of waveguide pathways directs an optical interference signal to the associated photodetector, the optical interference signal being formed of the modulated light received by the endpoint of one of the second plurality of waveguide pathways and a portion of the coherent light from the waveguide pathway receiving the modulated light.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. A two-stage interferometry system, comprising:
    a first stage, comprising:
        a plurality of coherent light sources, each light source of the plurality of light sources being operable to generate a beam of coherent light;
        separate waveguide pathways optically associated with each coherent light source of the plurality of coherent light sources, each separate waveguide pathway having an endpoint configured to emit at least a portion of the beam of coherent light from the associated light source;
        a plurality of photodetectors, at least one photodetector of the plurality of photodetectors optically associated with each waveguide pathway;
        a gimbal plate selectively movable about one or more axes; and
        a plurality of retroreflectors mounted on the gimbal plate and configured to receive the light emitted from each of the endpoints, modulate the received light, and reflect the modulated light back to the endpoints, wherein each of the waveguide pathways directs multiple optical interference signals to the associated photodetector, each of the optical interference signals being formed of the modulated light from one of the plurality of retroreflectors received by the endpoint of the waveguide pathway and a portion of the coherent light from the waveguide pathway receiving the modulated light;
    a second stage, comprising:
        one or more coherent light sources, each light source of the one or more light sources being operable to generate a beam of coherent light;
        separate waveguide pathways optically associated with each coherent light source of the one or more coherent light sources, each separate waveguide pathway having an endpoint configured to emit at least a portion of the beam of coherent light from the associated light source of the one or more light sources, the endpoints of the separate waveguide pathways of the second stage being connected to the gimbal plate such that movement of the gimbal plate moves the endpoints connected thereto; and
        one or more photodetectors, at least one photodetector of the one or more photodetectors optically associated with each waveguide pathway of the second stage.

2. The two-stage interferometry system of claim 1, wherein the first stage further comprises a stationary reference plate to which endpoints of the first stage waveguide pathways are connected.

3. The two-stage interferometry system of claim 1, wherein movement of the gimbal plate about the one or more axes changes the direction in which light is emitted from the endpoints of the one or more waveguide pathways.

4. The two-stage interferometry system of claim 1, wherein the second stage further comprises a plurality of retroreflectors mounted on a rigid object and configured to receive the light emitted from each of the endpoints of the one or more waveguide pathways, provide a unique modulation of the received light, and direct the modulated light back to the endpoints of the one or more waveguide pathways, wherein each of the one or more waveguide pathways directs an optical interference signal to the associated photodetector, the optical interference signal being formed of the modulated light received by the endpoint of one of the one or more waveguide pathways and a portion of the coherent light reflected from an endpoint of the waveguide pathway receiving the modulated light.

5. The two-stage interferometry system of claim 1, further comprising a beam splitter and a position sensitive photodetector.

* * * * *